US012809709B2

(12) United States Patent
Iwasaki

(10) Patent No.: US 12,809,709 B2
(45) Date of Patent: Nov. 24, 2026

(54) ANOMALY DETECTION SYSTEM, ANOMALY DETECTION DEVICE, ANOMALY DETECTION METHOD, AND COMPUTER PROGRAM

(71) Applicant: Sumitomo Electric Industries, Ltd., Osaka (JP)

(72) Inventor: Rui Iwasaki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/874,312

(22) PCT Filed: Jun. 16, 2022

(86) PCT No.: PCT/JP2022/024155
§ 371 (c)(1),
(2) Date: Dec. 12, 2024

(87) PCT Pub. No.: WO2023/243043
PCT Pub. Date: Dec. 21, 2023

(65) Prior Publication Data

US 2025/0355750 A1 Nov. 20, 2025

(51) Int. Cl.
*G06F 11/00* (2006.01)
*G06F 11/07* (2006.01)

(52) U.S. Cl.
CPC ........ *G06F 11/079* (2013.01); *G06F 11/0736* (2013.01)

(58) Field of Classification Search
CPC ........................... G06F 11/079; G06F 11/0736
USPC ........................................................ 714/1–57
See application file for complete search history.

(56) References Cited

U.S. PATENT DOCUMENTS

2005/0154562 A1* 7/2005 Matsuura .............. G06F 11/008 702/185
2007/0033511 A1* 2/2007 Davies .................. G06F 11/184 714/799
2014/0298099 A1* 10/2014 Tan ...................... G06F 11/079 714/37
(Continued)

FOREIGN PATENT DOCUMENTS

JP 2015-077658 A 4/2015
JP 2018-024055 A 2/2018
(Continued)

*Primary Examiner* — Sarai E Butler
(74) *Attorney, Agent, or Firm* — XSENSUS LLP

(57) ABSTRACT

An anomaly detection system includes: a sensor provided to a tool, the sensor being configured to measure a physical quantity, of the tool, that varies while a machine tool is machining a machining target object by means of the tool; and an anomaly detection device configured to detect an anomaly in the tool, based on measurement data obtained by the sensor. The anomaly detection device includes: a synchronization unit configured to achieve synchronization between target data being measurement data in time series obtained by the sensor, and reference data being a measurement result in time series of the physical quantity when the tool is in a normal state; a distance calculation unit configured to calculate a distance between the reference data and the target data; and an anomaly detection unit configured to detect an anomaly in the tool by comparing the distance with a threshold.

20 Claims, 21 Drawing Sheets

(56) References Cited

U.S. PATENT DOCUMENTS

| | | | | |
|---|---|---|---|---|
| 2015/0363251 | A1* | 12/2015 | Wang | G06F 11/3082 714/55 |
| 2016/0070614 | A1* | 3/2016 | Joshi | G06F 21/52 714/47.1 |
| 2016/0303698 | A1 | 10/2016 | Takahashi et al. | |
| 2016/0378608 | A1* | 12/2016 | Kong | G16H 20/30 714/15 |
| 2017/0019308 | A1* | 1/2017 | Rapoport | G06F 11/3452 |
| 2019/0210176 | A1 | 7/2019 | Yamamoto | |
| 2022/0026892 | A1* | 1/2022 | Uchida | G05B 23/0235 |
| 2022/0390911 | A1* | 12/2022 | Imai | G06Q 10/06 |
| 2023/0128408 | A1* | 4/2023 | Vrinda | H04L 43/045 715/744 |
| 2023/0168961 | A1* | 6/2023 | Lin | G06F 11/0736 714/26 |
| 2023/0305520 | A1 | 9/2023 | Shibasaki | |

FOREIGN PATENT DOCUMENTS

| | | | |
|---|---|---|---|
| JP | 2021-112800 | A | 8/2021 |
| WO | 2021/261418 | A1 | 12/2021 |

* cited by examiner

ANOMALY DETECTION SYSTEM, ANOMALY DETECTION DEVICE, ANOMALY DETECTION METHOD, AND COMPUTER PROGRAM

CROSS-REFERENCE TO RELATED APPLICATION

The present application is based on PCT filing PCT/JP2022/024155, filed Jun. 16, 2022, the entire contents of which is incorporated herein by reference.

TECHNICAL FIELD

The present disclosure relates to an anomaly detection system, an anomaly detection device, an anomaly detection method, and a computer program.

BACKGROUND ART

PATENT LITERATURE 1 discloses an anomaly detection device that detects an anomaly in a tool of a machine tool. The anomaly detection device disclosed in PATENT LITERATURE 1: learns, according to a one-class SVM method, pieces of measurement data of vibration information, cutting force information, sound information, a spindle load, a motor current, and an electric power value of the tool, to create a normal model; and while acquiring measurement data during machining after the normal model has been created, diagnoses whether the measurement data is normal or abnormal, based on the normal model. Further, the anomaly detection device re-diagnoses the measurement data having been diagnosed to be abnormal, according to a method, such as an invariant analysis, that is different from the one-class SVM method.

CITATION LIST

Patent Literature

PATENT LITERATURE 1: Japanese Laid-Open Patent Publication No. 2018-024055

SUMMARY OF THE INVENTION

An anomaly detection system according to an aspect of the present disclosure is configured to detect an anomaly in a tool of a machine tool. The anomaly detection system includes: a sensor provided to the tool, the sensor being configured to measure a physical quantity, of the tool, that varies while the machine tool is machining a machining target object by means of the tool; and an anomaly detection device configured to detect an anomaly in the tool, based on measurement data obtained by the sensor. The anomaly detection device includes: a synchronization unit configured to achieve synchronization between target data being measurement data in time series obtained by the sensor, and reference data being a measurement result in time series of the physical quantity when the tool is in a normal state; a distance calculation unit configured to calculate a distance between the reference data and the target data between which synchronization has been achieved by the synchronization unit; and an anomaly detection unit configured to detect an anomaly in the tool by comparing the distance calculated by the distance calculation unit with a threshold.

The present disclosure can be realized not only as an anomaly detection system including such a characteristic configuration as above, but also as an anomaly detection device included in the anomaly detection system, or as an anomaly detection method having steps of characteristic processes in the anomaly detection system. The present disclosure can be realized as a computer program that causes a computer to function as the anomaly detection device, or a part or the entirety of the anomaly detection device can be realized as a semiconductor integrated circuit.

DETAILED DESCRIPTION

Figure 1:
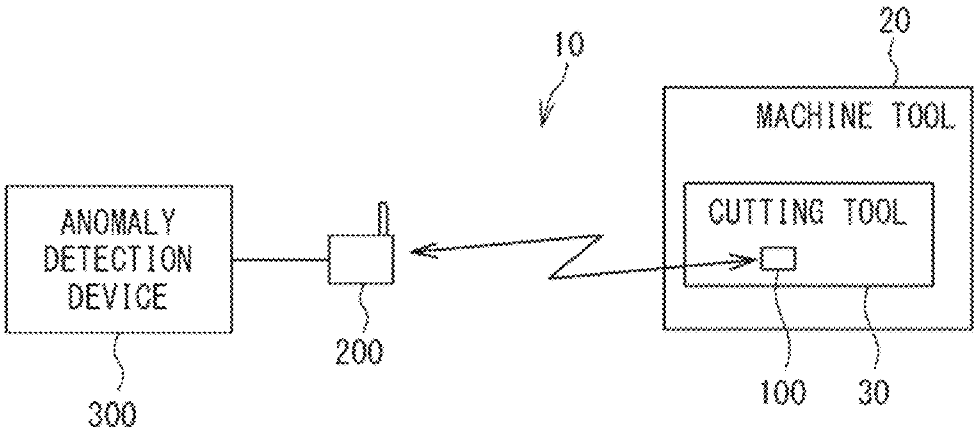
FIG. 1 shows an example of an entire configuration of an anomaly detection system according to an embodiment.

Problems to be Solved by the Present Disclosure

The anomaly detection device disclosed in PATENT LITERATURE 1 requires a large number of sensors such as a vibration sensor for measuring vibration of the tool, a tool dynamometer for measuring the cutting force of the tool, and a sound sensor for measuring the sound of the tool. Further, for machine learning, a large amount of measurement data needs to be acquired, and even when the measurement data for machine learning has been able to be acquired, the acquired measurement data needs to be inputted. Thus, machine learning requires a lot of work.

Effects of the Present Disclosure

According to the present disclosure, an anomaly in a tool of a machine tool can be detected without requiring a large number of sensors and a large amount of data.

Outline of Embodiment of the Present Disclosure

Hereinafter, outlines of an embodiment of the present disclosure will be listed and described.

(1) An anomaly detection system according to the present embodiment is configured to detect an anomaly in a tool of a machine tool. The anomaly detection system includes: a sensor provided to the tool, the sensor being configured to measure a physical quantity, of the tool, that varies while the machine tool is machining a machining target object by means of the tool; and an anomaly detection device configured to detect an anomaly in the tool, based on measurement data obtained by the sensor. The anomaly detection device includes: a synchronization unit configured to achieve synchronization between target data being measurement data in time series obtained by the sensor, and reference data being a measurement result in time series of the physical quantity when the tool is in a normal state; a distance calculation unit configured to calculate a distance between the reference data and the target data between which synchronization has been achieved by the synchronization unit; and an anomaly detection unit configured to detect an anomaly in the tool by comparing the distance calculated by the distance calculation unit with a threshold. Accordingly, unlike anomaly determination that uses machine learning, a large number of sensors are not required, and a large amount of measurement data for the machine leaming is not required. Since synchronization between the reference data and the target data is achieved, the difference between the current (at the time of anomaly detection) state and a normal state of the tool can be accurately calculated as a distance, and an anomaly can be accurately detected.

(2) In (1) above, the anomaly detection device may further include a period setting unit configured to set a target period in a machining step, that is identical, in the reference data and the target data, and the distance calculation unit may calculate a distance between the reference data and the target data in the target period set by the period setting unit. Accordingly, the reference data and the target data in an identical machining step can be compared with each other, and the distance accurately representing the difference between the current state and a normal state of the tool can be calculated.

(3) In (2) above, the machining step may be an intermittent cutting step in which cutting and non-cutting of the machining target object are repeated. In an intermittent cutting step, the state of the tool is more easily expressed in the physical quantity than in a continuous machining step in which cutting of the machining target object is continuously performed. Therefore, the distance accurately representing the difference between the current state and a normal state of the tool can be calculated.

(4) In any one of (1) to (3) above, the sensor may be a strain sensor configured to measure a strain in the tool as the physical quantity. The measurement value obtained by the strain sensor shows a high value while the tool is in contact with (is cutting the machining target object) the machining target object, and shows a low value while the tool is not in contact with (is not cutting the machining target object) the machining target object. When such measurement data obtained by the strain sensor is used, an anomaly in the tool can be accurately detected.

(5) In any one of (1) to (3) above, the sensor may be an acceleration sensor configured to measure an acceleration of the tool as the physical quantity. The measurement value obtained by the acceleration sensor repeatedly shows a high value and a low value while the tool is vibrating, and shows a low value while the tool is not vibrating. When such measurement data obtained by an acceleration sensor is used, an anomaly in the tool can be accurately detected.

(6) In any one of (1) to (5) above, the anomaly detection device may further include a correction unit configured to correct a baseline of the target data, and the distance calculation unit may calculate a distance between the reference data and the target data of which the baseline has been corrected by the correction unit. Accordingly, even when the baseline is different for each piece of the target data, an anomaly in the tool can be stably detected.

(7) In any one of (1) to (6) above, the distance between the reference data and the target data may be a distance between a time-series waveform of the reference data and a time-series waveform of the target data, or a difference between a distribution of the reference data and a distribution of the target data. Accordingly, in accordance with the measurement data, a distance suitable for the anomaly detection can be calculated.

(8) In any one of (1) to (7) above, the anomaly detection system may further include a display device configured to display a time-series graph of the distance, between the reference data and the target data, calculated by the distance calculation unit. Accordingly, the user can visually confirm temporal change in the state of the tool.

(9) An anomaly detection device according to the present embodiment is configured to detect an anomaly in a tool of a machine tool. The anomaly detection device includes: an acquisition unit configured to acquire measurement data in time series outputted from a sensor provided to the tool, the sensor being configured to measure a physical quantity, of the tool, that varies while the machine tool is machining a machining target object by means of the tool; a synchronization unit configured to achieve synchronization between target data being the measurement data in time series acquired by the acquisition unit, and reference data being a measurement result in time series of the physical quantity when the tool is in a normal state; a distance calculation unit configured to calculate a distance between the reference data and the target data between which synchronization has been achieved by the synchronization unit; and an anomaly detection unit configured to detect an anomaly in the tool by comparing the distance calculated by the distance calculation unit with a threshold. Accordingly, unlike anomaly determination that uses machine learning, a large number of sensors are not required, and a large amount of measurement data for the machine learning is not required. Since synchronization between the reference data and the target data is achieved, the difference between the current (at the time of anomaly detection) state and a normal state of the tool can be accurately calculated as a distance, and an anomaly can be accurately detected.

(10) An anomaly detection method according to the present embodiment is executed by an anomaly detection device configured to detect an anomaly in a tool of a machine tool. The anomaly detection method includes: a step of acquiring measurement data in time series outputted from a sensor provided to the tool, the sensor being configured to measure a physical quantity, of the tool, that varies while the machine tool is machining a machining target object by means of the tool; a step of achieving synchronization between target data being the acquired measurement data in time series, and reference data being a measurement result in time series of the physical quantity when the tool is in a normal state; a step of calculating a distance between the reference data and the target data between which synchronization has been achieved; and a step of detecting an anomaly in the tool by comparing the calculated distance with a threshold. Accordingly, unlike anomaly determination that uses machine learning, a large number of sensors are not required, and a large amount of measurement data for the machine learning is not required. Since synchronization between the reference data and the target data is achieved, the difference between the current (at the time of anomaly detection) state and a normal state of the tool can be accurately calculated as a distance, and an anomaly can be accurately detected.

(11) A computer program according to the present embodiment is for detecting an anomaly in a tool of a machine tool. The computer program causes a computer to execute: a step of acquiring measurement data in time series outputted from a sensor provided to the tool, the sensor being configured to measure a physical quantity, of the tool, that varies while the machine tool is machining a machining target object by means of the tool; a step of achieving synchronization between target data being the acquired measurement data in time series, and reference data being a measurement result in time series of the physical quantity when the tool is in a normal state; a step of calculating a distance between the reference data and the target data between which synchronization has been achieved; and a step of detecting an anomaly in the tool by comparing the calculated distance with a threshold. Accordingly, unlike anomaly determination that uses machine learning, a large number of sensors are not required, and a large amount of measurement data for the machine learning is not required. Since synchronization between the reference data and the target data is achieved, the difference between the current (at the time of anomaly detection) state and a normal state of the tool can be accurately calculated as a distance, and an anomaly can be accurately detected.

DETAILS OF EMBODIMENT OF THE PRESENT DISCLOSURE

Hereinafter, details of an embodiment of the present invention will be described with reference to the drawings. At least parts of the embodiment described below may be combined as desired.

1. Abnormality Detection System

FIG. 1 shows an example of an entire configuration of an anomaly detection system according to the present embodiment. An anomaly detection system 10 detects an anomaly in a cutting tool 30 of a machine tool 20. The cutting tool 30 is mounted to the machine tool 20. The machine tool 20 performs cutting machining on a machining target object by using the cutting tool 30. "Cutting machining" here includes: "turning machining" in which a machining target object that is rotating is cut by the cutting tool 30; and "rotating machining" in which a machining target object that is fixed is cut by the cutting tool 30 that is rotating. The machine tool 20 may be a turning machine such as a lathe, or may be a rotating machine such as a milling machine.

The anomaly detection system 10 includes the cutting tool 30, a wireless device 200, and an anomaly detection device 300. The wireless device 200 is connected to the anomaly detection device 300 in a wired manner, for example. The wireless device 200 is an access point, for example.

The cutting tool 30 includes a sensor module 100. As described later, the sensor module 100 includes a sensor.

The configuration of the anomaly detection system 10 is not limited to a configuration of including a single cutting tool 30, and the anomaly detection system 10 may include a plurality of the cutting tools 30.

The cutting tool 30 transmits a measurement result obtained by the sensor in the sensor module 100 to the anomaly detection device 300 in time series.

More specifically, the cutting tool 30 wirelessly transmits a radio signal including a packet storing a measurement value, to the wireless device 200.

The wireless device 200 acquires the packet included in the radio signal received from the cutting tool 30, and relays the packet to the anomaly detection device 300.

Upon receiving the sensor packet from the cutting tool 30 via the wireless device 200, the anomaly detection device 300 acquires measurement information from the received sensor packet, and processes the acquired measurement information.

The cutting tool 30 and the wireless device 200 perform wireless communication using a communication protocol such as ZigBee according to IEEE 802.15.4, Bluetooth (registered trademark) according to IEEE 802.15.1, or UWB (Ultra Wide Band) according to IEEE802.15.3a, for example. Between the cutting tool 30 and the wireless device 200, a communication protocol other than the above may be used.

2. Specific Example of Cutting Tool

Figure 2A:
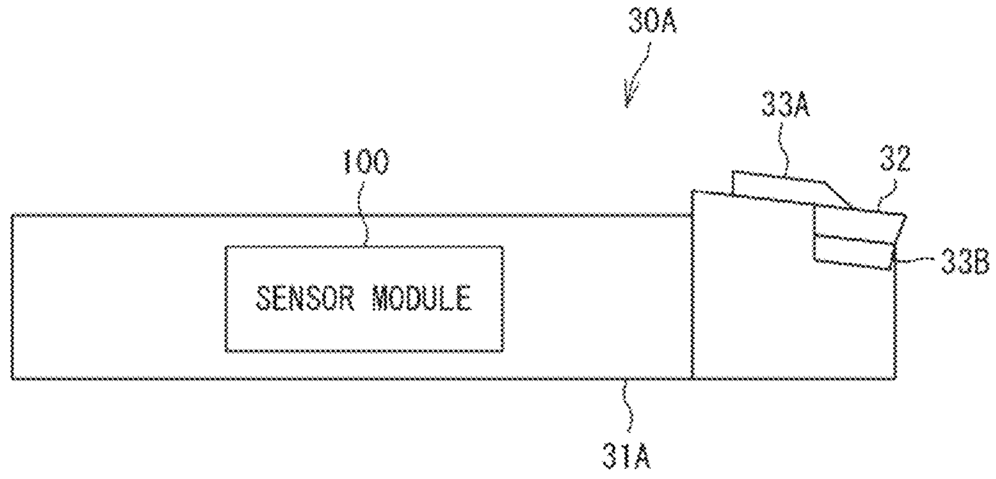
FIG. 2A shows an example of a configuration of a cutting tool according to the embodiment.

FIG. 2A shows an example of a configuration of a cutting tool according to the present embodiment.

A turning tool 30A, which is an example of the cutting tool 30, is a tool for turning machining to be used in machining of a machining target object that is rotating, and is mounted to a machine tool such as a lathe. The turning tool 30A includes a cutting part 31A and the sensor module 100 provided to the cutting part 31A.

For example, the cutting part 31A can have mounted thereto a cutting insert 32 having a cutting blade. Specifically, the cutting part 31A is a shank that holds the cutting insert 32. That is, the turning tool 30A is a so-called throw-away cutting tool.

More specifically, the cutting part 31A includes fixing members 33A, 33B. The fixing members 33A, 33B hold the cutting insert 32.

In a top view, the cutting insert 32 has a polygonal shape such as a triangle, a square, a rhombus, or a pentagon, for example. For example, the cutting insert 32 has a through-hole formed at the center of the top face of the cutting insert 32, and is fixed to the cutting part 31A by the fixing members 33A, 33B.

Figure 2B:
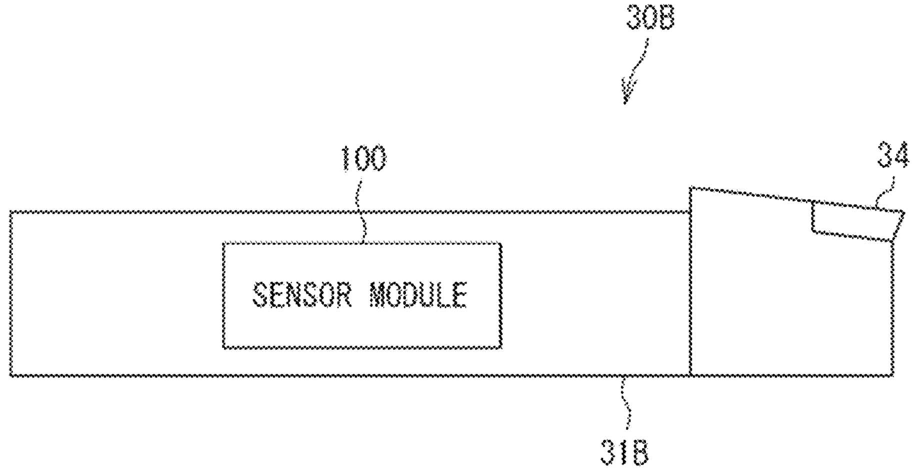
FIG. 2B shows another example of the configuration of the cutting tool according to the embodiment.

FIG. 2B shows another example of the configuration of the cutting tool according to the present embodiment.

A turning tool 30B, which is an example of the cutting tool 30, is a tool for turning machining, and is mounted to a machine tool such as a lathe. The turning tool 30B includes a cutting part 31B and the sensor module 100 provided to the cutting part 31B.

For example, the cutting part 31B has a cutting blade 34. That is, the turning tool 30B is a solid cutting tool or a brazed cutting tool.

Figure 2C:
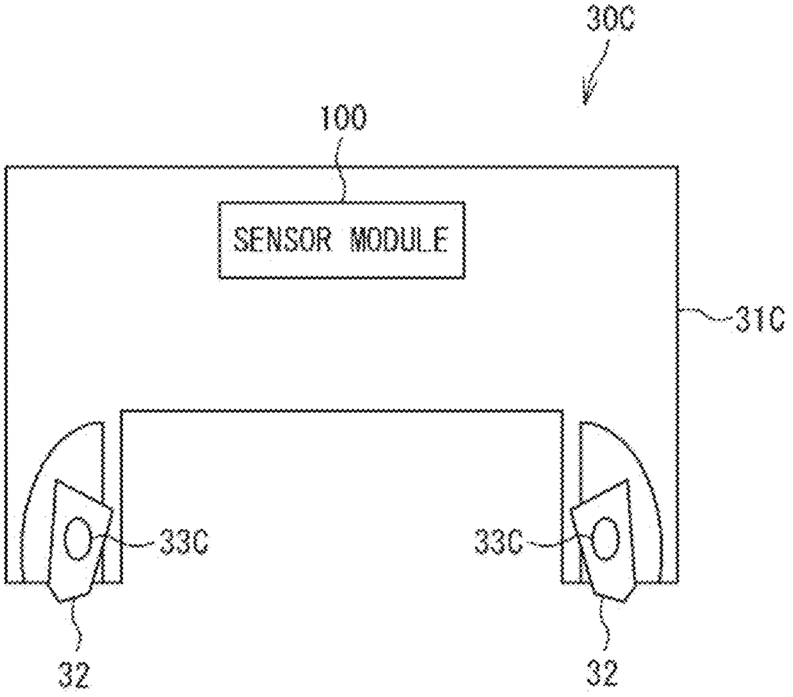
FIG. 2C shows another example of the configuration of the cutting tool according to the embodiment.

FIG. 2C shows another example of the configuration of the cutting tool according to the present embodiment. FIG. 2C shows a cross-sectional view of the cutting tool.

A rotating tool 30C, which is an example of the cutting tool 30, is a tool for rotating machining to be used in machining of a machining target object that is fixed, and is mounted to a machine tool such as a milling machine. The rotating tool 30C includes a cutting part 31C and the sensor module 100 provided to the cutting part 31C.

For example, the cutting part 31C can have mounted thereto the cutting insert 32 having a cutting blade. Specifically, the cutting part 31C is a holder that holds the cutting insert 32. That is, the rotating tool 30C is a so-called milling cutter.

More specifically, the cutting part 31C includes a plurality of fixing members 33C. Each fixing member 33C holds the cutting insert 32.

The cutting inserts 32 are fixed to the cutting part 31C by the fixing members 33C.

Figure 2D:
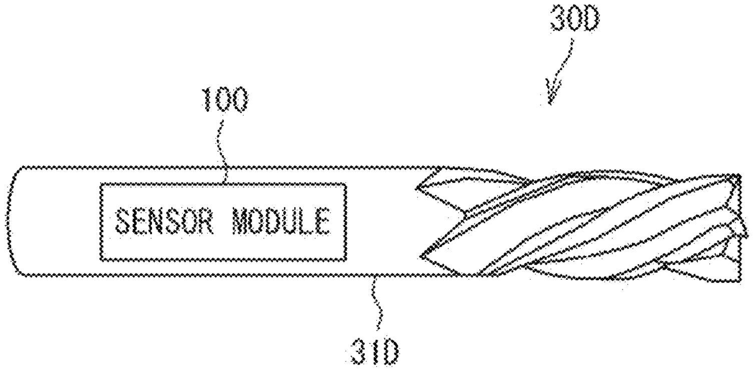
FIG. 2D shows another example of the configuration of the cutting tool according to the embodiment.

FIG. 2D shows another example of the configuration of the cutting tool according to the present embodiment.

A rotating tool 30D, which is an example of the cutting tool 30, is a tool for rotating machining, and is mounted to a machine tool such as a milling machine. The rotating tool 30D includes a cutting part 31D, and the sensor module 100 provided to the cutting part 31D.

For example, the cutting part 31D has a cutting blade 35. That is, the rotating tool 30D is an end mill.

3. Sensor Module

Figure 3:
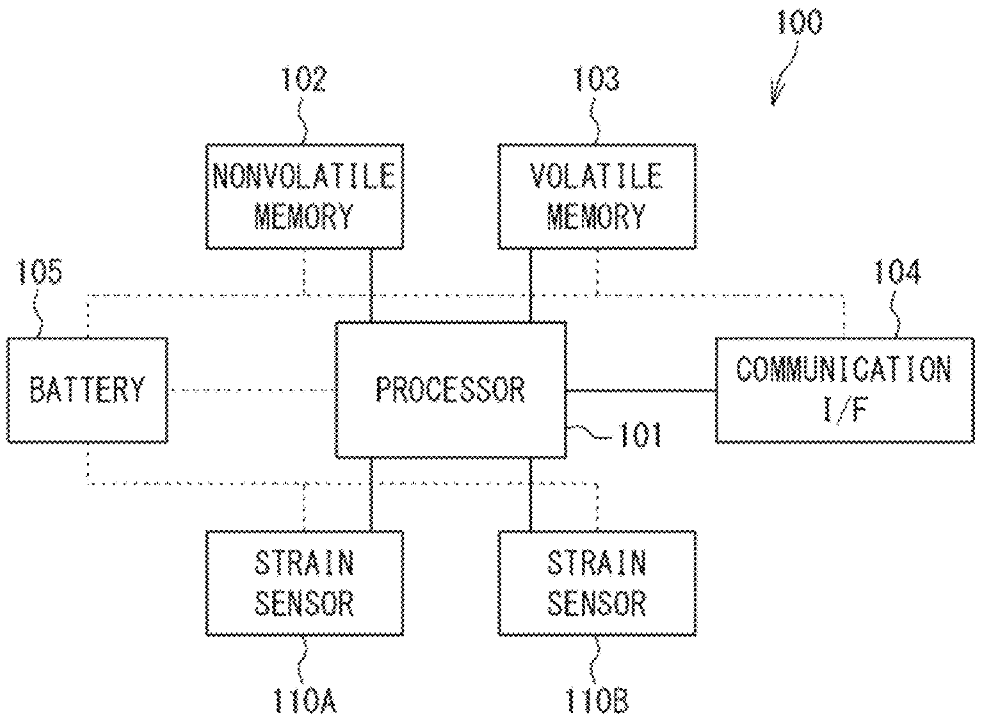
FIG. 3 shows an example of a configuration of a sensor module according to the embodiment.

FIG. 3 shows an example of a configuration of a sensor module according to the present embodiment.

The sensor module 100 includes a processor 101, a nonvolatile memory 102, a volatile memory 103, a communication interface (I/F) 104, and strain sensors 110A, 110B.

The volatile memory 103 is a volatile memory such as an SRAM (Static Random Access Memory) or a DRAM (Dynamic Random Access Memory), for example. The nonvolatile memory 102 is a nonvolatile memory such as a flash memory or a ROM (Read Only Memory), for example. For example, the nonvolatile memory 102 has stored therein a computer program (not shown) and data to be used in execution of the computer program. The computer program is a program for transmitting, in time series, the measurement values obtained by the strain sensors 110A, 110B.

The processor 101 is a CPU (Central Processing Unit), for example. However, the processor 101 is not limited to a CPU. The processor 101 may be a GPU (Graphics Processing Unit). In a specific example, the processor 101 is a multicore GPU. For example, the processor 101 may be an ASIC (Application Specific Integrated Circuit), or may be a programmable logic device such as a gate array or an FPGA (Field Programmable Gate Array).

The communication I/F 104 is a communication interface for a communication protocol such as ZigBee according to IEEE 802.15.4, Bluetooth according to IEEE 802.15.1, or UWB according to IEEE802.15.3a, for example. The communication I/F 104 is realized by a communication circuit such as a communication IC (Integrated Circuit), for example.

The sensor module 100 includes a battery 105. The battery 105 supplies electric power to the processor 101, the nonvolatile memory 102, the volatile memory 103, the communication I/F 104, and the strain sensors 110A, 110B.

The strain sensors 110A, 110B are provided in the vicinity of the cutting blade in the cutting tool 30, for example. The strain sensors 110A and 110B are mounted to the cutting tool 30 so as to measure strains in directions different from each other. For example, the strain sensor 110A measures a strain in the longitudinal direction of the cutting tool 30, and the strain sensor 110B measures a strain in the width direction of the cutting tool 30. In the following, the strain sensors 110A, 110B will also be collectively referred to as a strain sensor 110. The strain sensor 110 is an example of a sensor. The sensor is driven with electric power supplied from the battery 105.

The configuration of the sensor module 100 is not limited to the configuration of including two strain sensors 110, and the sensor module 100 may include one or three or more strain sensors 110. Instead of the strain sensor 110 or in addition to the strain sensor 110, the sensor module 100 may include other sensors such as an acceleration sensor, a pressure sensor, a sound sensor, and a temperature sensor.

4. Hardware Configuration of Anomaly Detection Device

Figure 4:
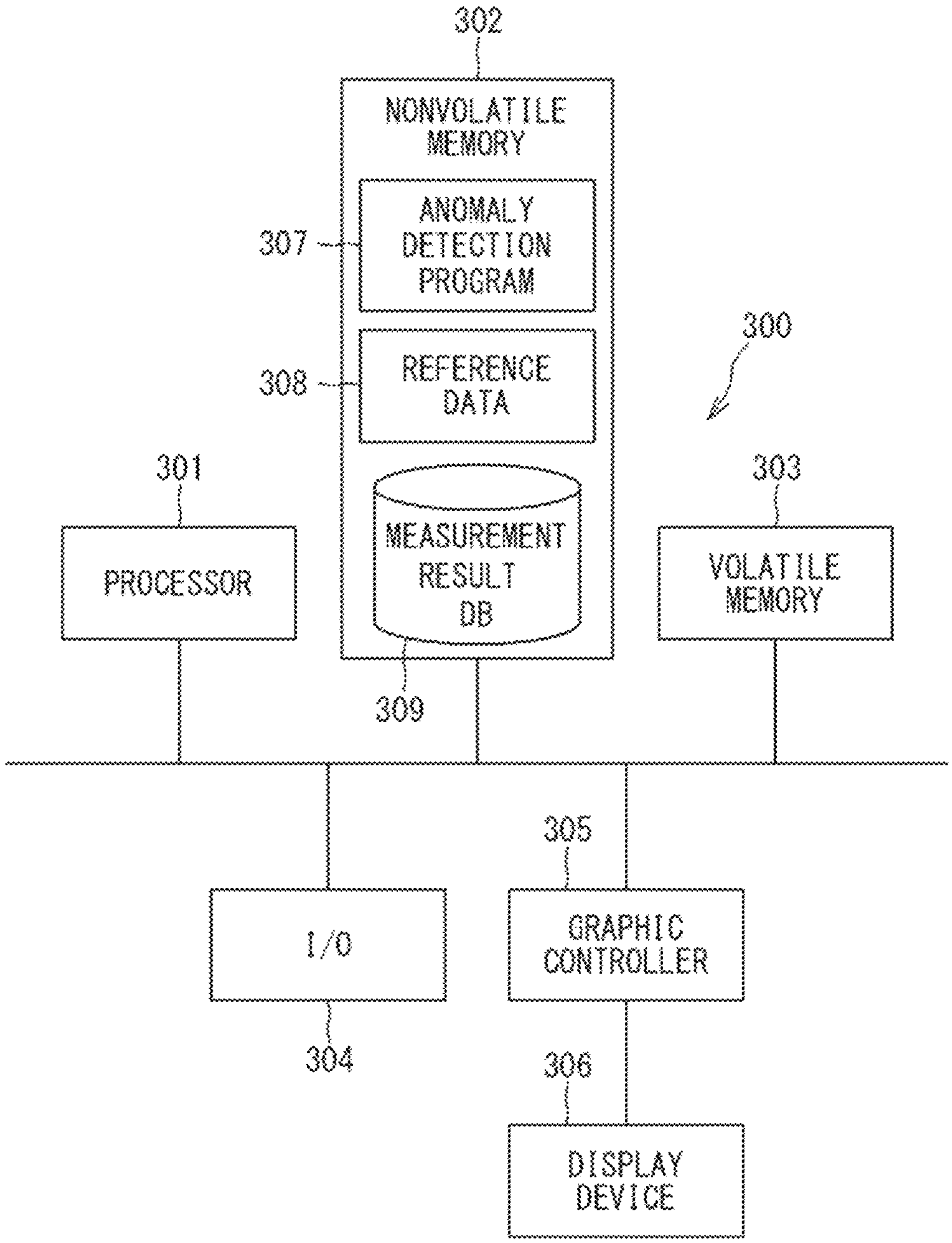
FIG. 4 is a block diagram showing an example of a hardware configuration of an anomaly detection device according to the embodiment.

FIG. 4 is a block diagram showing an example of a hardware configuration of an anomaly detection device according to the present embodiment.

The anomaly detection device 300 includes a processor 301, a nonvolatile memory 302, a volatile memory 303, an input/output interface (I/O) 304, a graphic controller 305, and a display device 306.

The volatile memory 303 is a volatile memory such as an SRAM or a DRAM, for example. The nonvolatile memory 302 is a nonvolatile memory such as a flash memory, a hard disk, or a ROM, for example. The nonvolatile memory 302 has stored therein an anomaly detection program 307, which is a computer program, and data to be used in execution of the anomaly detection program 307. Each function of the anomaly detection device 300 is realized by the anomaly detection program 307 being executed by the processor 301. The anomaly detection program 307 can be stored in a storage medium such as a flash memory, a ROM, or a CD-ROM.

The nonvolatile memory 302 has stored therein reference data 308. The reference data 308 is data to be used by the anomaly detection program 307, and is the measurement result in time series of the strain when the cutting tool 30 is in a normal state.

The nonvolatile memory 302 is provided with a measurement result database (DB) 309. The measurement result DB 309 stores measurement results obtained by the strain sensor 110. More specifically, in the measurement result DB 309, measurement values of the strain outputted from the strain sensor 110 are accumulated in time series in each constant sampling cycle. The reference data 308 is data created from past measurement results stored in the measurement result DB 309, for example.

The processor 301 is a CPU, for example. The processor 301 may be one or a plurality of CPUs. However, the processor 301 is not limited to a CPU. The processor 301 may be a GPU. In a specific example, the processor 301 is a multicore GPU. For example, the processor 301 may be an ASIC, or may be a programmable logic device such as a gate array or an FPGA. In this case, the ASIC or the programmable logic device is configured to be able to execute the same processes as the anomaly detection program 307.

The I/O 304 is connected to the wireless device 200. For example, the I/O 304 is a communication I/F, and can perform communication according to a specific communication protocol. The I/O 304 includes an Ethernet interface ("Ethernet" is a registered trademark), for example. The I/O 304 can receive a measurement result obtained by the strain sensor 110 from the cutting tool 30 via the wireless device 200.

The graphic controller 305 is connected to the display device 306, and controls display in the display device 306. For example, the graphic controller 305 includes a GPU and a VRAM (Video RAM), holds, in the VRAM, data to be displayed in the display device 306, periodically reads out video data corresponding to one frame from the VRAM, and generates a video signal. The generated video signal is outputted to the display device 306, and the video is displayed in the display device 306. The function of the graphic controller 305 may be included in the processor 301. A partial region of the volatile memory 303 may be used as the VRAM.

The display device 306 includes a liquid crystal panel or an OEL (organic electroluminescence) panel, for example. The display device 306 can display information of characters or figures.

5. Function of Anomaly Detection Device

Figure 5:
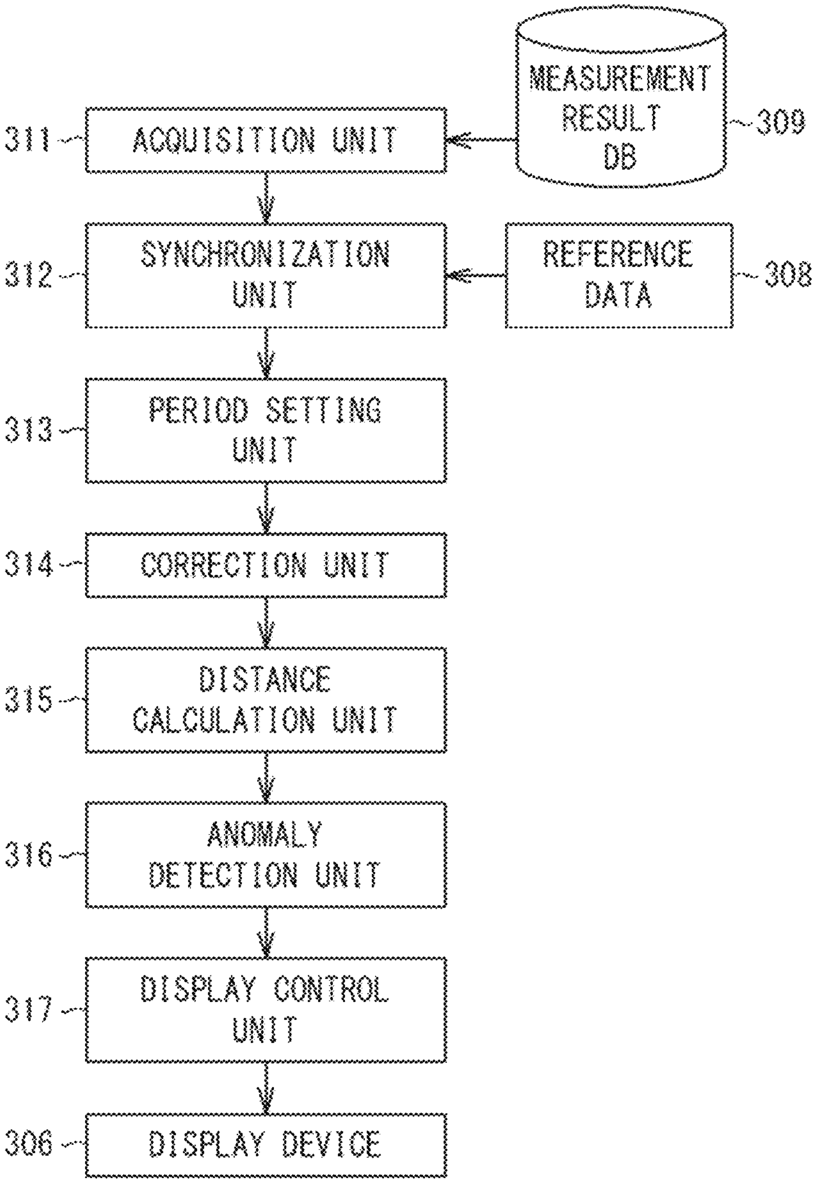
FIG. 5 is a function block diagram showing an example of the function of the anomaly detection device according to the embodiment.

FIG. 5 is a function block diagram showing an example of the function of the anomaly detection device according to the present embodiment. The anomaly detection device 300 has functions of an acquisition unit 311, a synchronization unit 312, a period setting unit 313, a correction unit 314, a distance calculation unit 315, an anomaly detection unit 316, and a display control unit 317.

The acquisition unit 311 acquires measurement data of the strain in the cutting tool 30 during the time when the machine tool 20 is machining the machining target object by means of the cutting tool 30. The measurement data is time-series data of the measurement values obtained by the strain sensor 110. The strain in the cutting tool 30 is an example of the physical quantity that varies while the machine tool 20 is machining the machining target object by means of the cutting tool 30.

Figure 6:
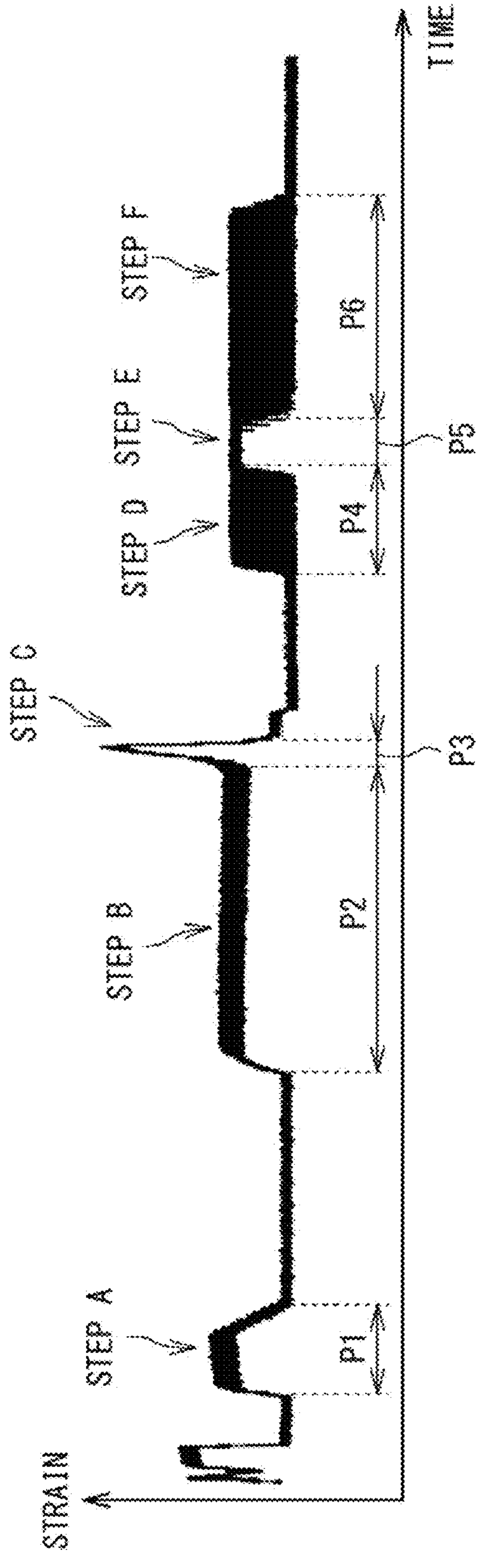
FIG. 6 is a graph showing an example of the waveform in time series of the strain in the cutting tool.

FIG. 6 is a graph showing an example of the waveform in time series of the strain in the cutting tool. In FIG. 6, the vertical axis represents strain and the horizontal axis represents time. Cutting machining of the machining target object includes a plurality of steps having different machining conditions. For example, turning machining by means of a lathe onto one machining target object includes outer diameter machining steps for a plurality of outer diameters, and inner diameter machining steps for a plurality of inner diameters. In a series of cutting machining, in each step, the waveform pattern of the measurement value of the strain in the cutting tool 30 changes. In the example in FIG. 6, cutting machining of one machining target object includes a step A, a step B, a step C, a step D, a step E, and a step F. The step A is executed in a period P1, the step B is executed in a period P2, the step C is executed in a period P3, the step D is executed in a period P4, the step E is executed in a period P5, and the step F is executed in a period P6. The respective machining conditions of the step A, the step B, the step C, the step D, the step E, and the step F are different from each other. Therefore, the respective waveform patterns of the strain in the step A, the step B, the step C, the step D, the step E, and the step F are different from each other.

With reference back to FIG. 5, the synchronization unit 312 achieves synchronization between the target data, which is the measurement data in time series acquired by the acquisition unit 311, and the reference data 308, which is the measurement result in time series of the strain when the cutting tool 30 is in a normal state. The magnitude of the strain differs depending on the cutting machining step. Therefore, unless the measurement values of the strain in a specific step are evaluated, detection of an anomaly in the cutting tool 30 cannot be accurately performed. In order to allow comparison between the target data and the reference data 308 in an identical step, the synchronization unit 312 achieves synchronization between the target data and the reference data 308.

Figure 7:
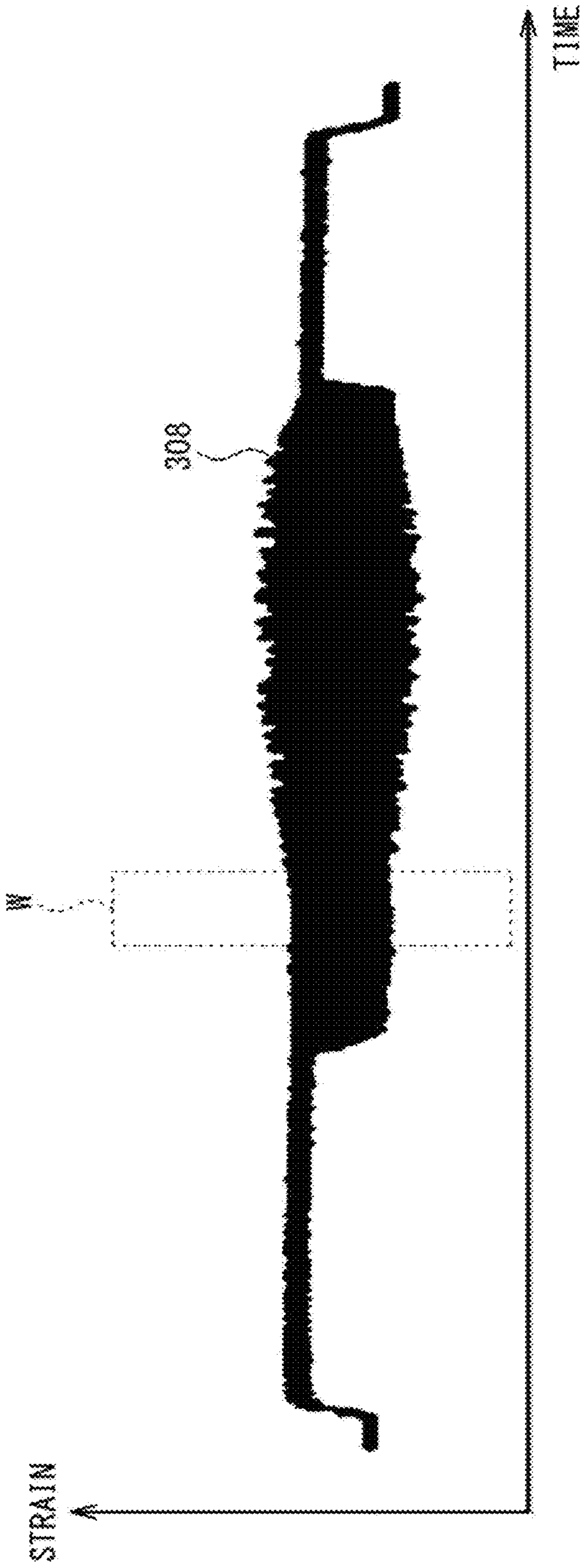
FIG. 7 is a graph showing an example of reference data.
Figure 8:
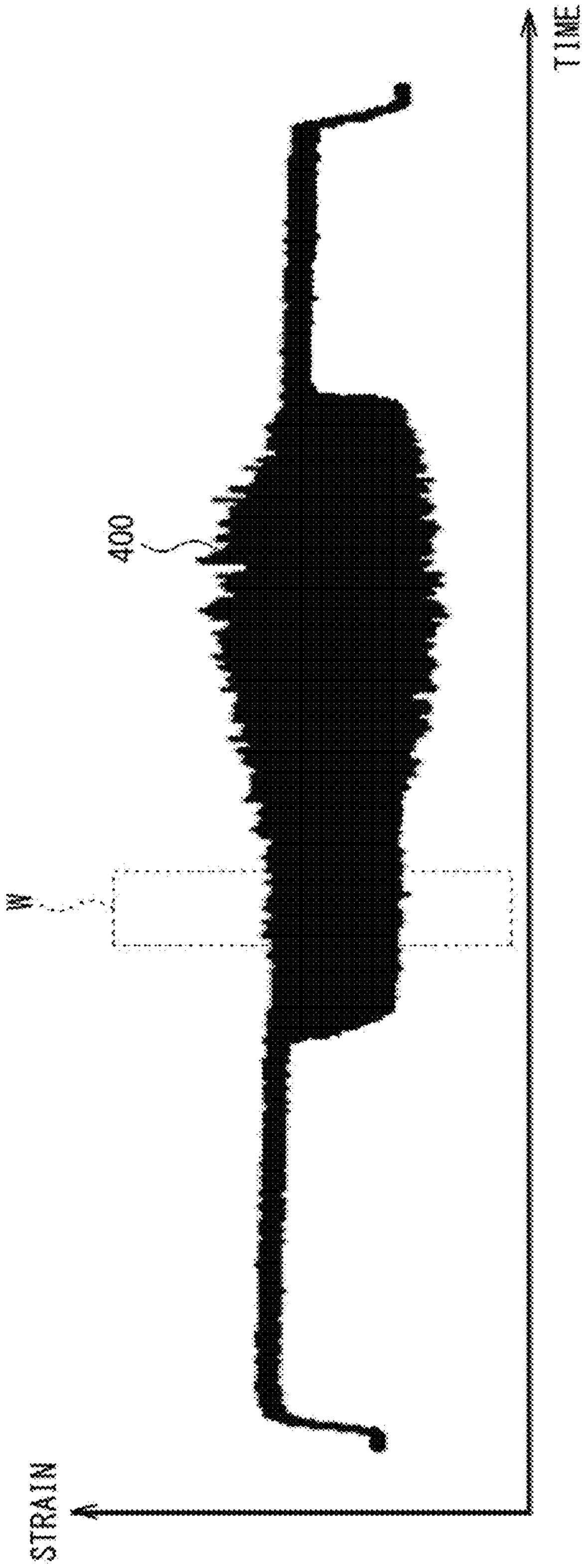
FIG. 8 is a graph showing an example of target data.

FIG. 7 is a graph showing an example of the reference data and FIG. 8 is a graph showing an example of the target data. In FIG. 7 and FIG. 8, the vertical axis represents strain and the horizontal axis represents time. The anomaly detection device 300 compares target data 400 with the reference data 308 and detects an anomaly in the cutting tool 30. Therefore, it is necessary to achieve synchronization between the target data 400 and the reference data 308. Achieving synchronization between the target data 400 and the reference data 308 means matching the start time of the step in the target data 400 with the start time period of the step in the reference data 308 and matching the end time of the step in the target data 400 with the end time period of the step in the reference data 308. FIG. 8 shows the target data 400 synchronized with the reference data 308 shown in FIG. 7. When synchronization between the target data 400 and the reference data 308 is achieved like this, the waveform of the reference data and the waveform of the target data 400 in an identical step can be compared, and an anomaly in the cutting tool 30 can be detected with high accuracy.

Figure 9:
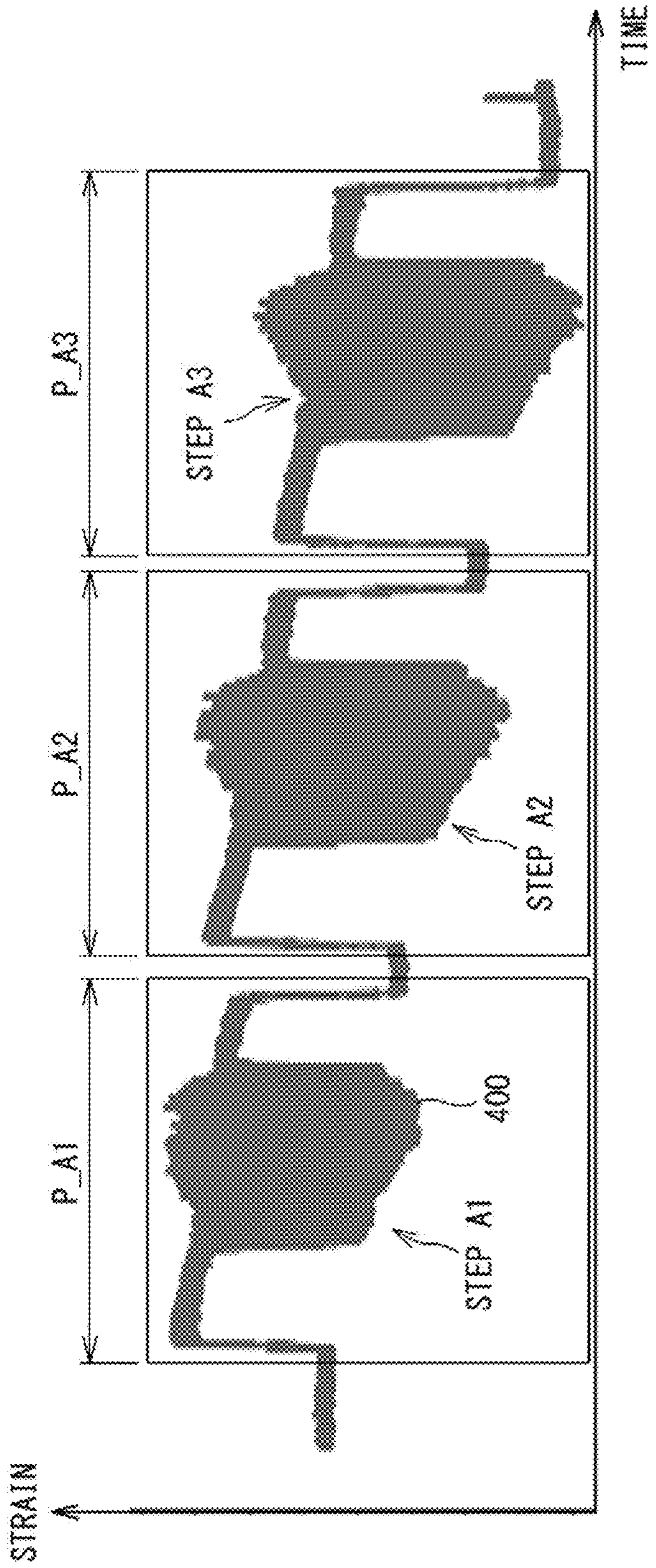
FIG. 9 is a graph showing an example of a measurement result obtained by a strain sensor when a step having an identical machining condition is repeated a plurality of times.

FIG. 9 is a graph showing an example of the measurement result obtained by the strain sensor when a step having an identical machining condition is repeated a plurality of times. In the example in FIG. 9, the measurement result obtained by the strain sensor in three steps of the step A1, the step A2, and the step A3 is shown. The step A1, the step A2, and the step A3 are steps having an identical machining condition. In FIG. 9, the waveforms of the steps A2 and A3 have shifted due to thermal drift. The waveform shift will be described later. As shown in FIG. 9, when a step having an identical machining condition is repeated a plurality of times, the waveform pattern of the strain in each of the steps A1, A2, A3 is acquired.

The synchronization unit 312 determines a cut-out period including one step in the target data 400, and extracts (cuts out) the time-series waveform pattern of the determined cut-out period from the target data 400. The cut-out period is a period corresponding to a period showing a waveform pattern in the reference data 308. In the example in FIG. 9, the synchronization unit 312 determines cut-out periods P_A1, P_A2, P_A3 of the respective steps A1, A2, A3, and cuts out the time-series waveform patterns of the respective steps A1, A2, A3 from the target data 400.

Figure 10:
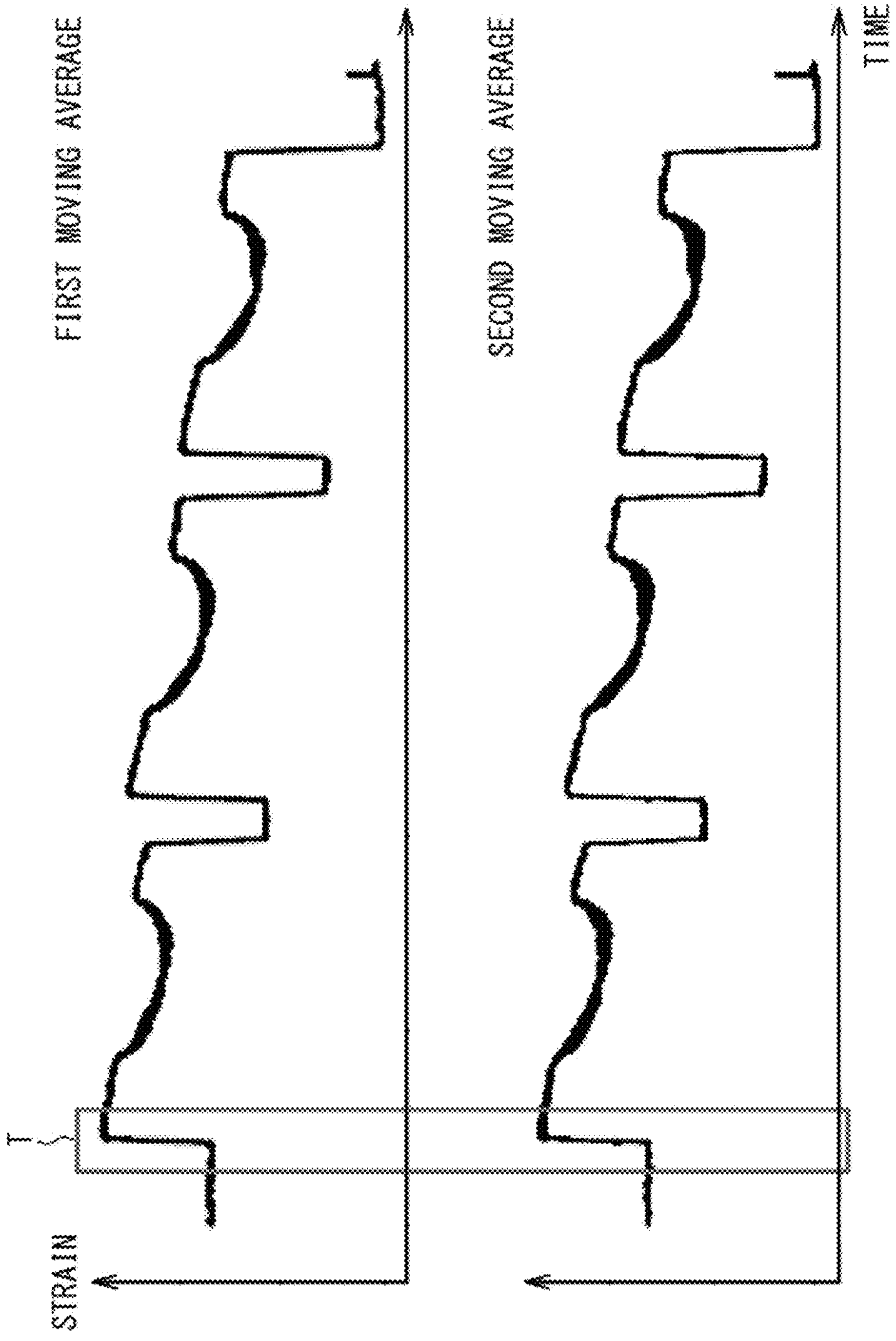
FIG. 10 is a graph showing an example of a first moving average and a second moving average of the target data.

Determination of the cut-out period by the synchronization unit 312 will be described. In order to determine the cut-out period, the synchronization unit 312 calculates a first moving average and a second moving average of the target data 400. FIG. 10 is a graph showing an example of the first moving average and the second moving average of the target data 400. In FIG. 10, the vertical axis represents the moving average value of strain and the horizontal axis represents time. In FIG. 10, the upper graph shows the first moving average, and the lower graph shows the second moving average. Between the first moving average and the second moving average, the numbers of data points for calculating the average value are different from each other. For example, the number of data points for the first moving average is 100, and the number of data points for the second moving average is 200.

Figure 11:
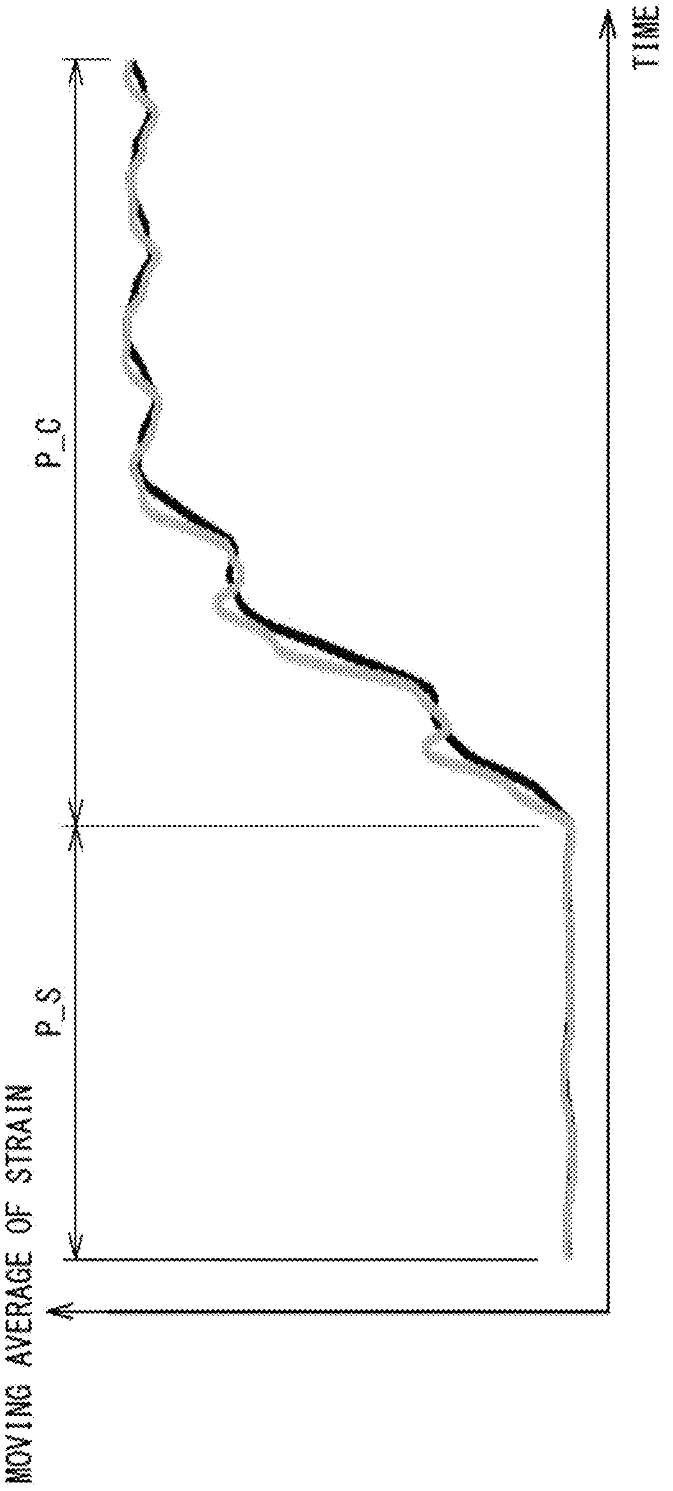
FIG. 11 is an enlarged graph of a T portion in FIG. 10.

FIG. 11 is an enlarged graph of a T portion in FIG. 10. In FIG. 11, the vertical axis represents the moving average value of strain and the horizontal axis represents time. In FIG. 11, the black-line graph shows the first moving average, and a gray-line graph shows the second moving average. As shown in FIG. 11, between the first moving average and the second moving average, since the numbers of data points are different, the change in the value are different. That is, in a period P_S in which the value is approximately constant, the first moving average and the second moving average show substantially identical values, and in a period P_C in which the value changes, the first moving average and the second moving average show values different from each other. Using such change in the value, the synchronization unit 312 specifies the change point of the value of the moving average, i.e., the boundary point between the period P_S and the period P_C.

Figure 12:
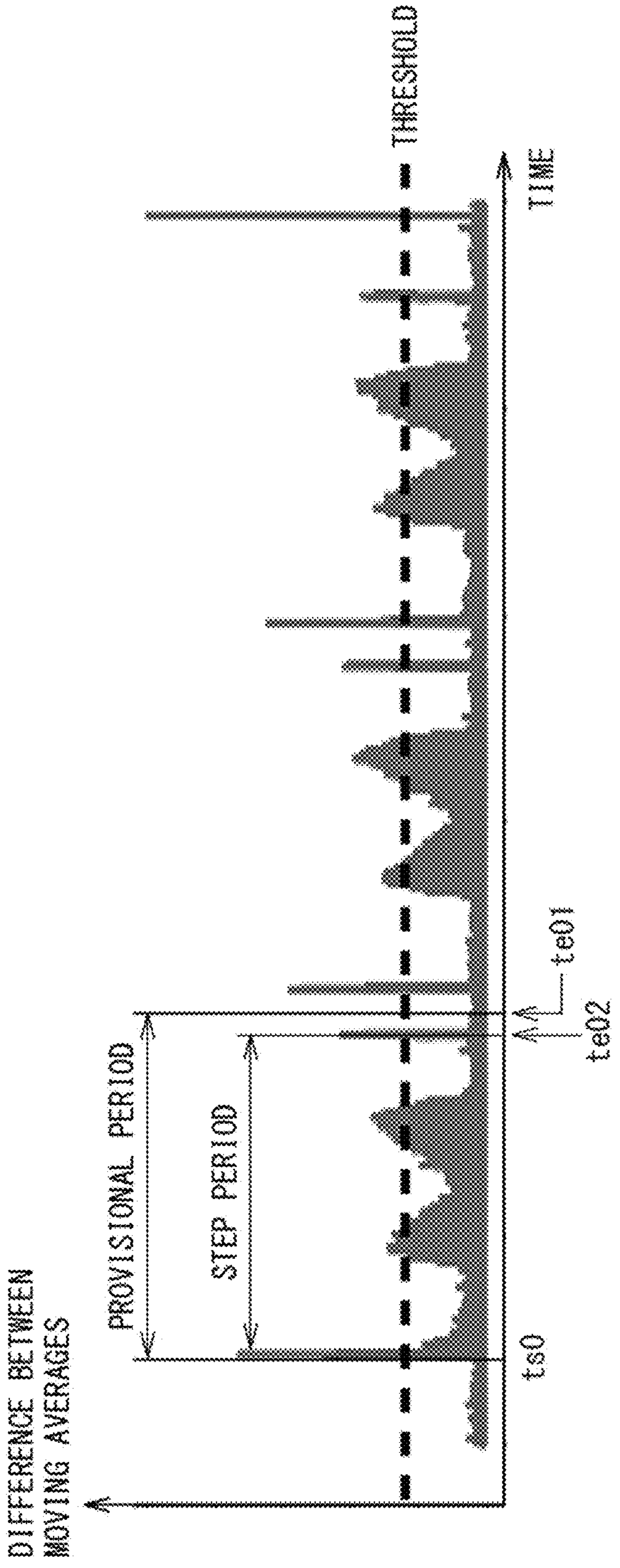
FIG. 12 is a graph showing an example of a difference between moving averages.

In a specific example, the synchronization unit 312 calculates the absolute value (hereinafter referred to as "difference between moving averages") of the difference between the first moving average and the second moving average. In the period P_S in FIG. 11, the difference between moving averages is small, and in the period P_C, the difference between moving averages includes a large value. FIG. 12 is a graph showing an example of the difference between moving averages. In FIG. 12, the vertical axis represents the difference between moving averages and the horizontal axis represents time. The synchronization unit 312 compares the difference between moving averages with a threshold (first threshold) and specifies a time point ts0 when the difference between moving averages has exceeded the first threshold. That is, the synchronization unit 312 compares the difference between moving averages with the first threshold in time order from the start time of the difference between moving averages, and specifies the time point ts0 when the difference between moving averages has exceeded the first threshold for the first time.

The synchronization unit 312 determines a provisional period starting from the specified time point ts0. The provisional period is determined by using a registered period, which has been registered in advance based on the reference data 308. For example, a user registers, as the registered period, a period of one specific step included in the reference data 308. Information on the registered period is stored in the nonvolatile memory 302, for example. Using the time point ts0 as the starting point, the synchronization unit 312 determines a period having the same length as the registered period, as the provisional period.

From a time te01, which is the end point of the provisional period, the synchronization unit 312 compares the difference between moving averages with the first threshold in reverse time order, and specifies a time point te02 when the difference between moving averages has exceeded the first threshold for the first time. The synchronization unit 312 determines the period from the time point ts0 to the time point te02, as a step period.

Figure 13:
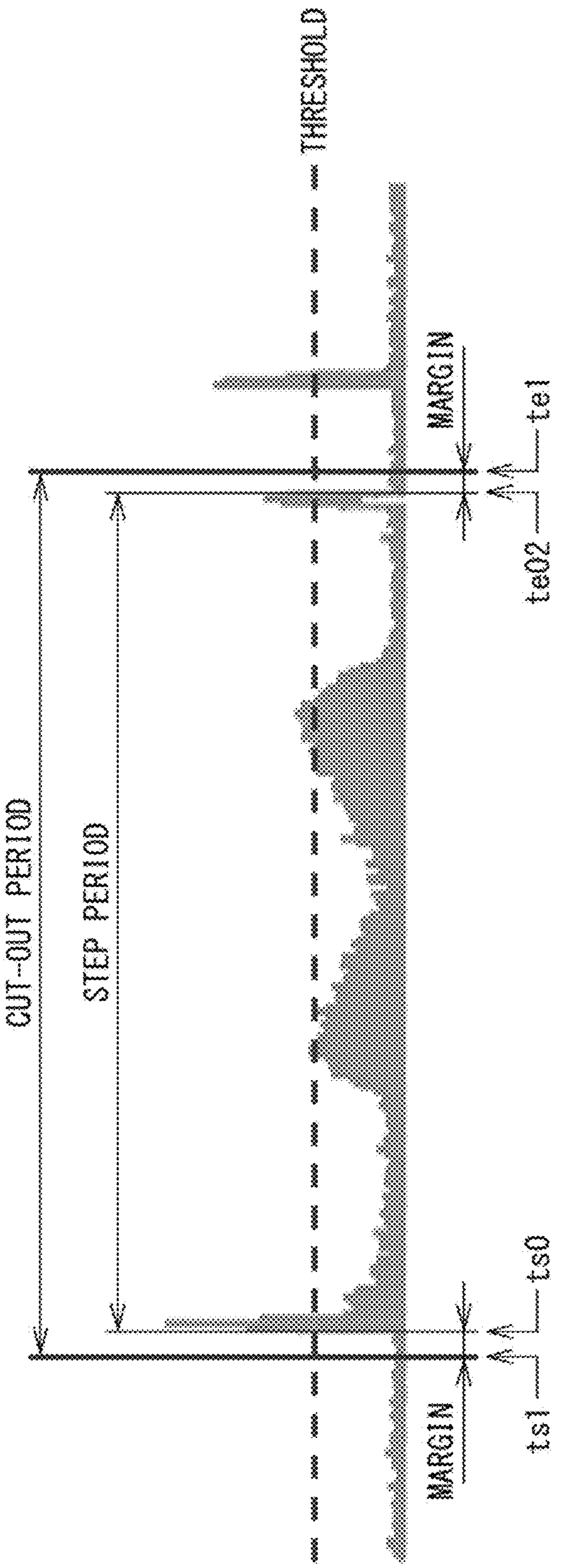
FIG. 13 is a graph for describing an example of determination of a cut-out period.

The synchronization unit 312 determines a cut-out period, based on the step period. The cut-out period is a period for cutting out waveform data from the target data 400. FIG. 13 is a graph for describing an example of determination of the cut-out period. In FIG. 13, the vertical axis represents the difference between moving averages and the horizontal axis represents time. The synchronization unit 312 specifies a time point ts1, which is before, by a margin, the time point ts0, and specifies a time point te1, which is after, by a margin, the time point te02. The synchronization unit 312 determines the period from the time point ts1 to the time point te1, as the cut-out period. The margin is determined based on the step period. For example, the margin is ½ of the difference between the registered period and the step period. However, the margin may be a period determined in advance.

The cut-out period as described above is set in a period in which a specific step is being performed by using the cutting tool 30. In a specific example, the cut-out period is set in an intermittent cutting step in which cutting and non-cutting of the machining target object are repeated. In a continuous machining step in which cutting of the machining target object continues, even when an anomaly has occurred in the cutting tool 30, a constant strain is stably caused in the cutting tool 30. In contrast, in the intermittent cutting step, no strain is caused in the cutting tool 30 during non-cutting, and a strain is caused in the cutting tool 30 during cutting. That is, a state where a strain is caused in the cutting tool 30 and a state where no strain is caused in the cutting tool 30 are repeated. Therefore, an anomaly having been caused in the cutting tool 30 appears as a variation in the strain in the cutting tool 30, for example. Therefore, if the measurement result of the strain in the intermittent cutting step is used, an anomaly in the cutting tool 30 can be accurately detected.

With reference back to FIG. 5, the synchronization unit 312 cuts out the waveform data in the determined cut-out period from the target data 400. The cut-out waveform data (hereinafter, referred to as "cut-out data") has been synchronized with the reference data 308.

The period setting unit 313 sets a target period (hereinafter referred to as "window") in a machining step, that is identical, in the reference data 308 and the cut-out data. With reference to FIG. 7 and FIG. 8, the window will be described. A window W is a partial period in one step. The window W is a period common between the reference data 308 and the cut-out data. For example, the period setting unit 313 sets a partial period in the reference data 308, as the window W.

With reference back to FIG. 5, the correction unit 314 corrects the baseline of the cut-out data. As described above, the waveform data of the measurement values of the strain shifts due to thermal drift. FIG. 9 is referred to. In cutting machining, frictional heat is generated in the cutting tool 30. The measurement result that is obtained by the strain sensor 110 varies under influence of the heat. This is the thermal drift. As shown in FIG. 9, the strain waveform shifts due to the thermal drift. In order to accurately detect an anomaly in the cutting tool 30, the correction unit 314 corrects the shift of the strain waveform due to the thermal drift.

In the example in FIG. 9, in the cutting machining of one time, the same step is repeatedly performed, and the waveform pattern of the strain in the subsequent steps A2 and A3 shifts, due to the thermal drift, to the positive side with respect to the waveform pattern of the strain in the previous step A1. Similarly, due to the thermal drift, the waveform pattern of the strain in the subsequent step A3 shifts to the positive side with respect to the waveform pattern of the strain in the previous step A2.

Figure 14A:
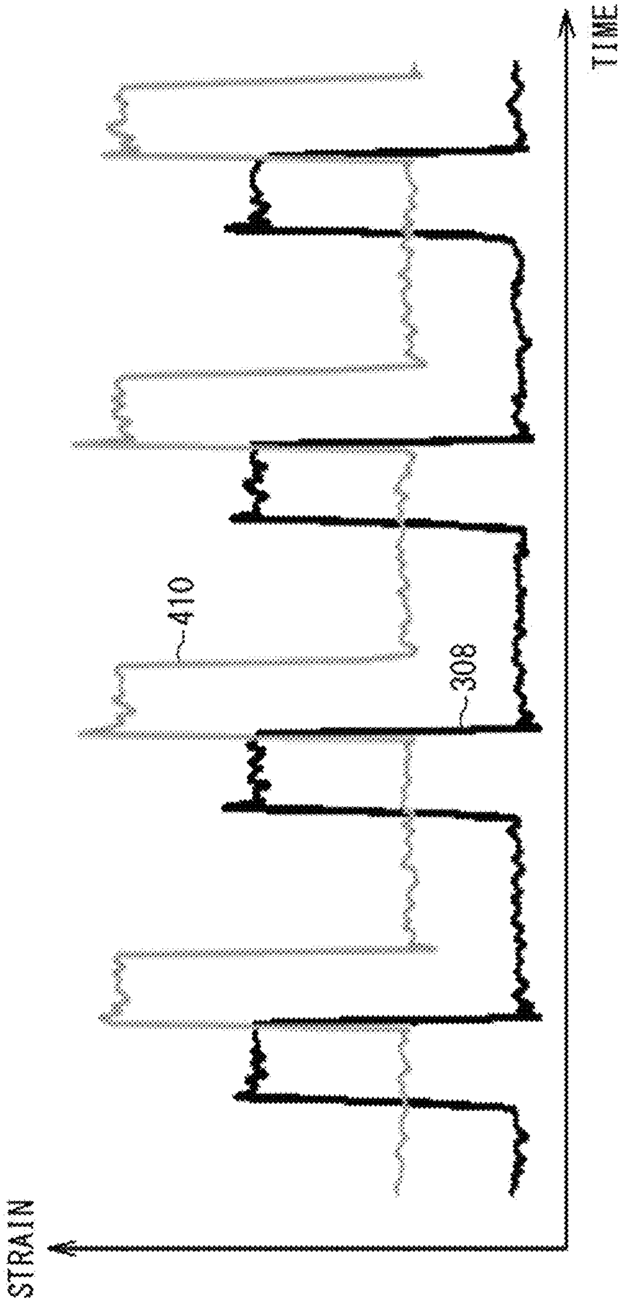
FIG. 14A is a graph showing an example of cut-out data before correction.
Figure 14B:
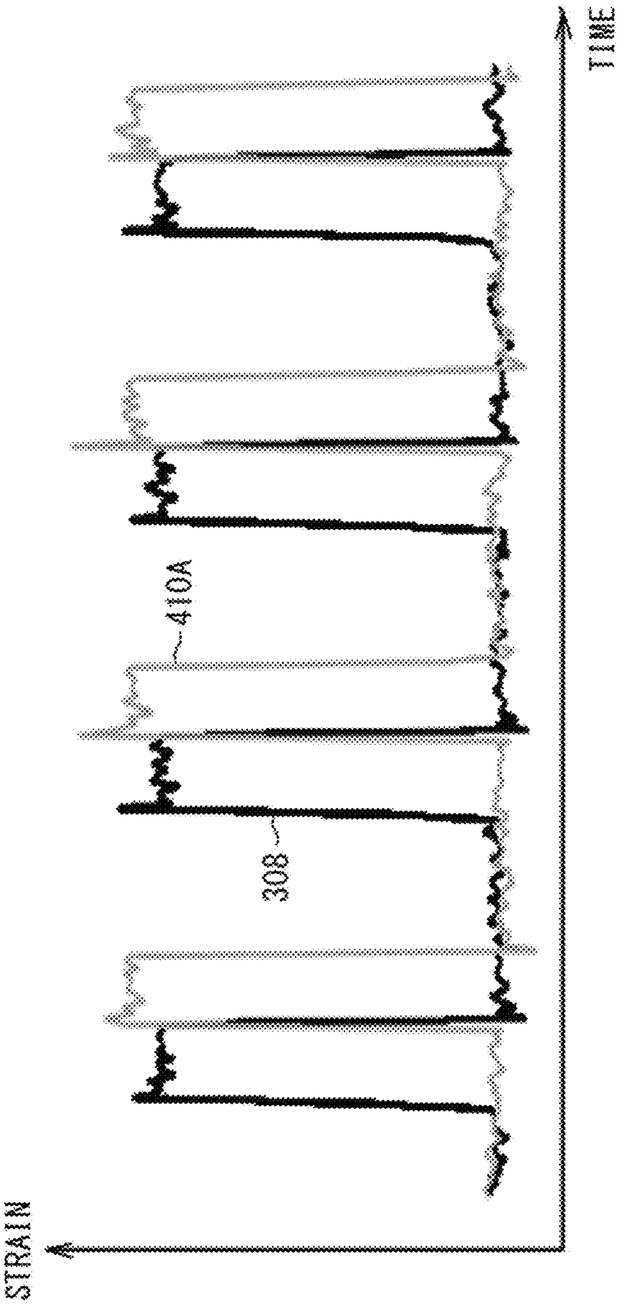
FIG. 14B is a graph showing an example of the cut-out data after correction.

FIG. 14A is a graph showing an example of the cut-out data before correction, and FIG. 14B is a graph showing an example of the cut-out data after correction. In FIG. 14A and FIG. 14B, the vertical axis represents strain and the horizontal axis represents time. In FIG. 14A and FIG. 14B, the black-line graph shows the reference data 308, and the gray-line graph shows cut-out data 410. For example, the reference data 308 is data after correction. That is, in the reference data 308, the waveform shift due to the thermal drift is corrected in advance.

In a specific example, the correction unit 314 calculates the average value of the strain measurement values of the cut-out data 410 in the window W, and subtracts the average value from each measurement value of the cut-out data 410 in the window W, to correct the baseline of the cut-out data 410. As shown in FIG. 14B, the baseline of cut-out data 410A after correction coincides with the baseline of the reference data 308. The baseline of the reference data 308 need not necessarily be corrected in advance. In this case, the correction unit 314 subtracts the average value from each measurement value of the reference data 308 in the window W, to correct the baseline of the reference data 308.

With reference back to FIG. 5, the distance calculation unit 315 calculates the distance between the reference data 308 and the target data 400 (the cut-out data 410A) between which synchronization has been achieved by the synchronization unit 312. In a specific example, the distance calculation unit 315 calculates the distance between the reference data 308 and the cut-out data 410A in the window W set by the period setting unit 313. The distance calculation unit 315 calculates the distance between the reference data 308 and the cut-out data 410A of which the baseline has been corrected by the correction unit 314.

An example of the distance between the reference data 308 and the cut-out data 410A is the distance between the time-series waveform of the reference data 308 and the time-series waveform of the cut-out data 410A. In a more specific example, the distance between the reference data 308 and the cut-out data 410A is DTW (dynamic time warping) between the reference data 308 and the cut-out data 410A.

Figure 15:
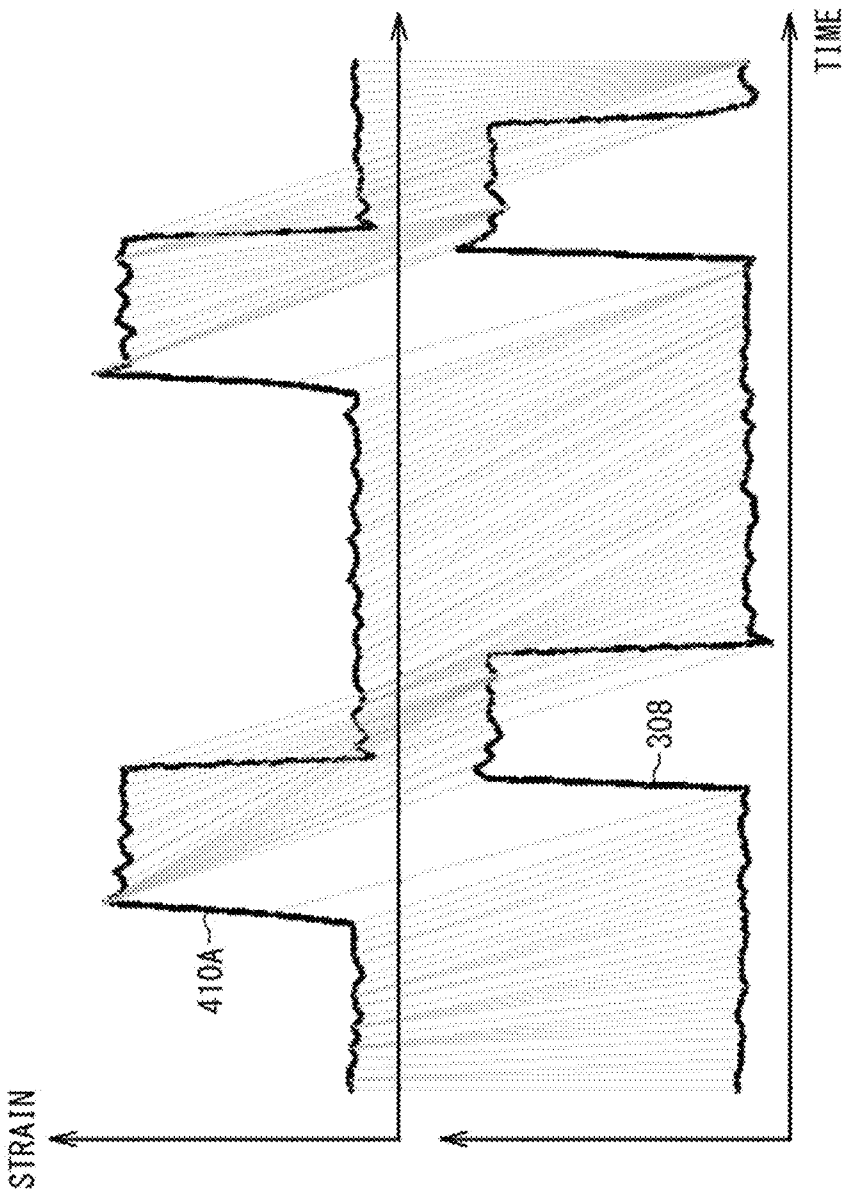
FIG. 15 is a graph for describing DTW between reference data and the cut-out data.

FIG. 15 is a graph for describing the DTW between the reference data 308 and the cut-out data 410A. In FIG. 15, the vertical axis represents strain and the horizontal axis represents time. In FIG. 15, the upper graph shows the cut-out data 410A and the lower graph shows the reference data 308. In FIG. 15, for easy understanding, the reference data 308 and the cut-out data 410A are shown in separate coordinate systems. However, in actuality, the DTW between the waveform of the reference data 308 and the waveform of the cut-out data 410A in one common coordinate axes (axis for strain and axis for time) is calculated. In the calculation of the DTW, the distance calculation unit 315 calculates, in a round-robin manner, the distance (the absolute value of error) between each point of the reference data 308 and each point of the cut-out data 410A, and determines the minimum value out of the calculated distances, as the distance between the reference data 308 and the cut-out data 410A. The determined distance is regarded as an anomaly degree of the cutting tool 30.

With reference back to FIG. 5, the anomaly detection unit 316 detects an anomaly in the cutting tool 30 by comparing the distance (the anomaly degree) calculated by the distance calculation unit 315 with a threshold (second threshold). Specifically, when the anomaly degree has exceeded the second threshold, the anomaly detection unit 316 determines that an anomaly has occurred in the cutting tool 30, and when the anomaly degree is equal to or less than the second threshold, determines that no anomaly has occurred in the cutting tool 30 (being in a normal state). The second threshold is determined based on the position of the window W. However, the second threshold may be set in advance. For example, the second threshold is determined according to Hotelling's $T^2$ method. However, the second threshold may be determined by using another method.

When comparison between the anomaly degree and the second threshold has been performed with respect to one window W, the period setting unit 313 sets a period slightly shifted from the original window W, as a new window W. In the new window W, the cut-out data 410 is cut out from the target data 400, the correction unit 314 corrects the baseline of the cut-out data 410, the distance calculation unit 315 calculates the distance between the reference data 308 and the cut-out data 410A, and the anomaly detection unit 316 performs comparison between the anomaly degree and the second threshold. For example, in the target data 400, a period (hereinafter, "detection target period") in which anomaly detection is performed is set in advance, and the period setting unit 313 can sequentially set the window W by shifting a predetermined time, from the starting point to the end point of the detection target period. Accordingly, in the entirety of the detection target period, the anomaly degree is sequentially calculated, whereby the anomaly detection for the cutting tool 30 is performed. The detection target period is set as a partial or the entire period of the cut-out period, for example.

The display control unit 317 outputs a video signal to the display device 306 and controls display of the display device 306. When the anomaly detection unit 316 has detected an anomaly in the cutting tool 30, the display control unit 317 causes the display device 306 to display the detection of the anomaly. Accordingly, the user is notified of the detection of the anomaly.

Figure 16A:
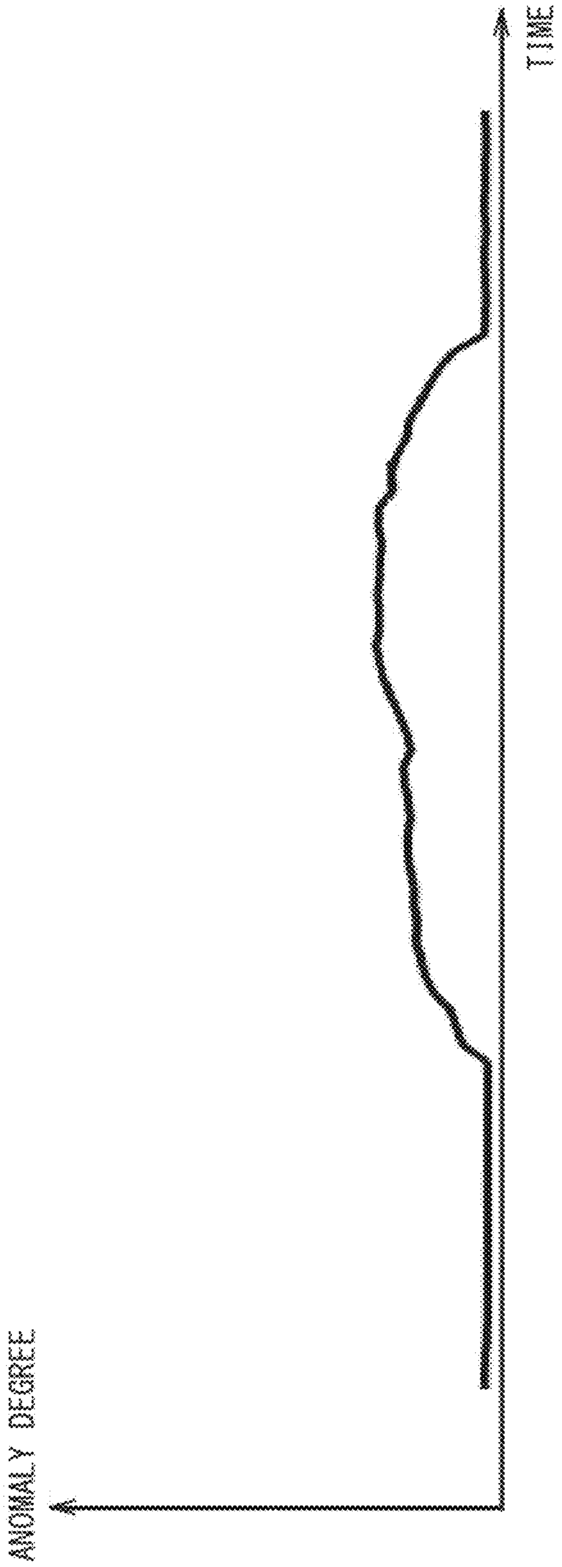
FIG. 16A is a graph showing an example of an anomaly degree graph.
Figure 16B:
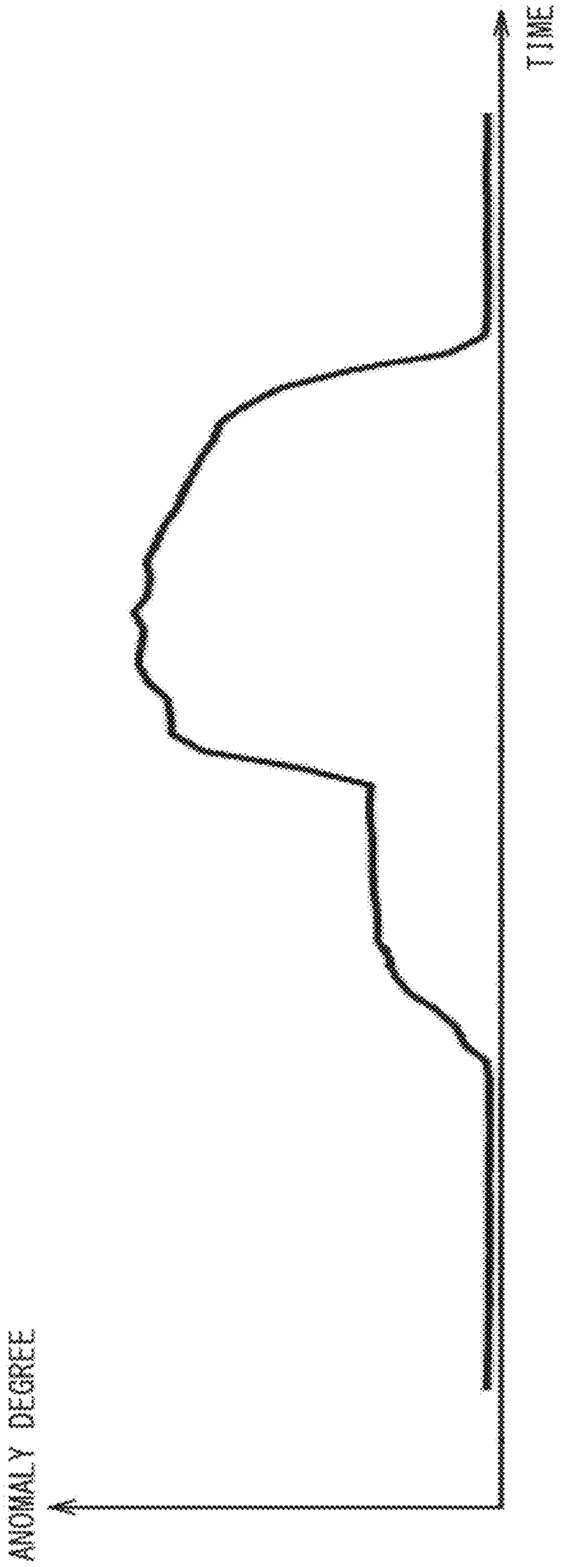
FIG. 16B is a graph showing another example of the anomaly degree graph.

The display control unit 317 can cause the display device 306 to display a time-series graph (hereinafter, referred to as "anomaly degree graph") of the anomaly degree calculated by the distance calculation unit 315. FIG. 16A is a graph showing an example of the anomaly degree graph, and FIG. 16B is a graph showing another example of the anomaly degree graph. In FIG. 16A and FIG. 16B, the vertical axis represents anomaly degree, and the horizontal axis represents time. FIG. 16A is the anomaly degree graph when the cutting tool 30 is in a normal state, and FIG. 16B is the anomaly degree graph when the cutting tool 30 is in an abnormal state. Through the display of the anomaly degree graph as shown in FIG. 16A and FIG. 16B, the user can confirm temporal transition of the anomaly degree. Through the display of the time-series graph of the anomaly degree, when the cutting tool 30 has become worn and the state thereof has changed from a normal state to an abnormal state, the user can confirm how the state has changed.

6. Operation of Anomaly Detection Device

Figure 17:
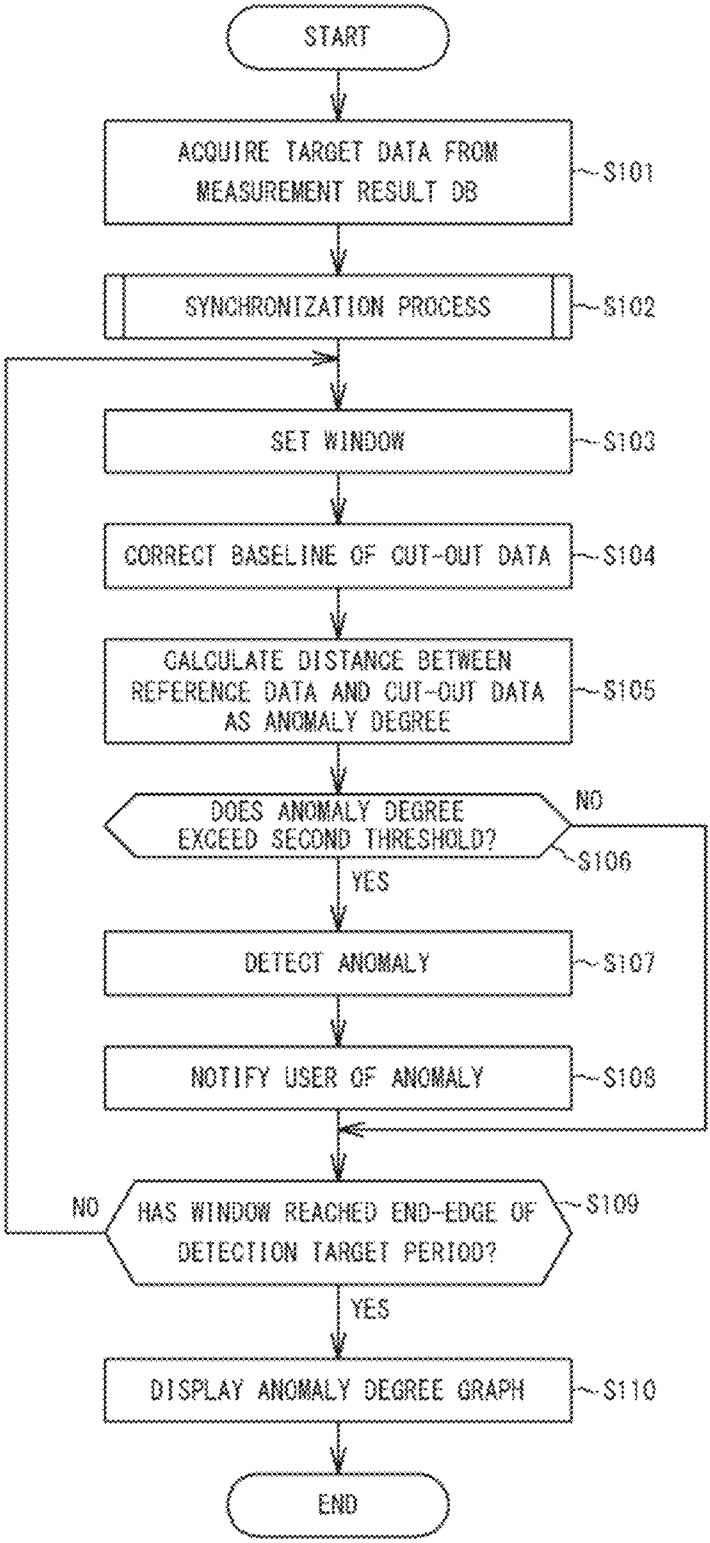
FIG. 17 is a flowchart showing an example of an anomaly detection process performed by the anomaly detection device according to the embodiment.

The processor 301 of the anomaly detection device 300 executes the anomaly detection program 307, whereby the processor 301 executes an anomaly detection process described below. FIG. 17 is a flowchart showing an example of the anomaly detection process performed by the anomaly detection device according to the present embodiment.

While the cutting tool 30 is used and the machining target object is being subjected to cutting machining with the machine tool 20, the strain sensor 110 measures the strain in the cutting tool 30. The sensor module 100 wirelessly transmits a measurement result obtained by the strain sensor 110 to the anomaly detection device 300. The anomaly detection device 300 receives the measurement result of the strain, and stores the measurement result into the measurement result DB 309. In this manner, measurement data in time series is accumulated in the measurement result DB 309.

The processor 301 acquires the target data 400, which is the measurement data to serve as the target of the anomaly detection, from the measurement result DB (step S101).

The processor 301 executes a synchronization process of achieving synchronization between the acquired target data 400 and the reference data 308 (step S102).

Figure 18:
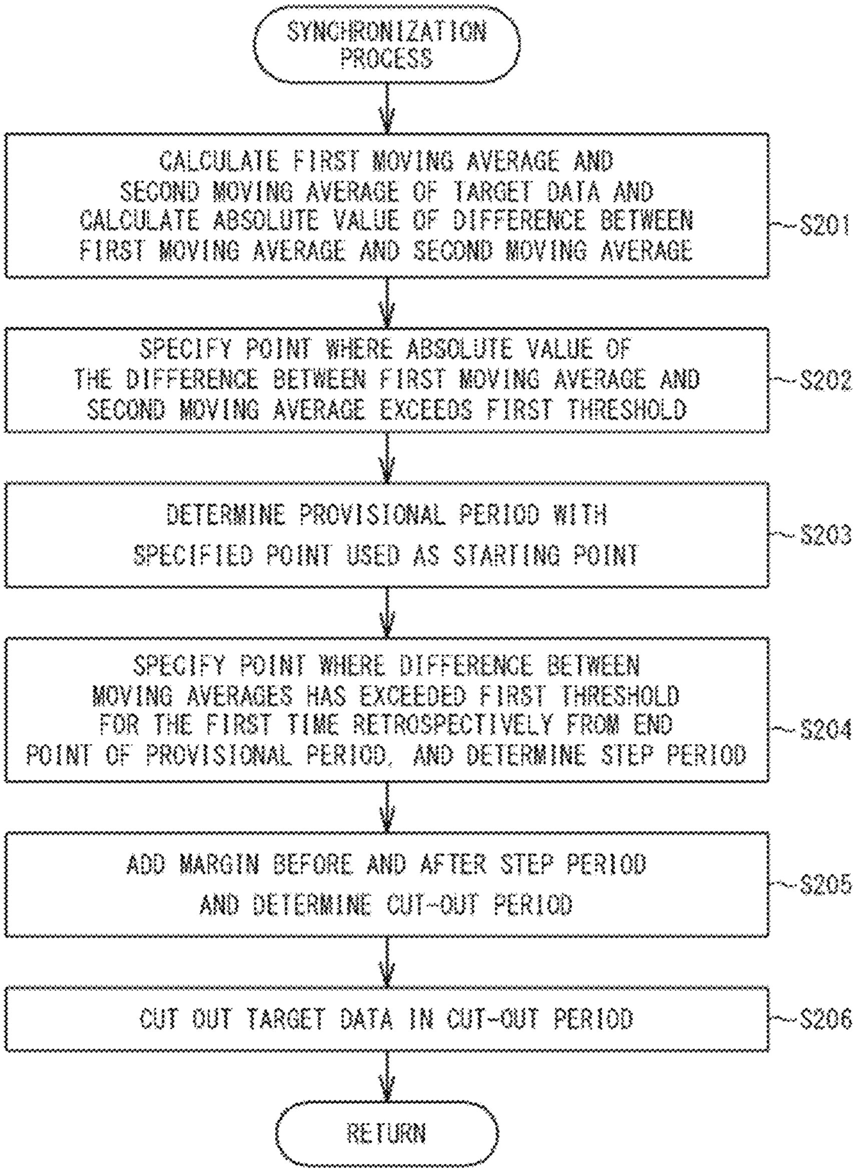
FIG. 18 is a flowchart showing an example of a synchronization process.

FIG. 18 is a flowchart showing an example of the synchronization process.

In the synchronization process, the processor 301 calculates the first moving average and the second moving average of the target data 400, and calculates the difference between moving averages (step S201). Next, the processor 301 compares the difference between moving averages with the first threshold, and specifies the time point ts0 when the difference between moving averages has exceeded the first threshold (step S202).

Using the registered period, the processor 301 determines a provisional period with the specified time point ts0 used as the starting point (step S203). The processor 301 compares the difference between moving averages with the first threshold in reverse time order from the time te01, which is the end point of the provisional period, and specifies the time point te02 when the difference between moving averages has exceeded the first threshold for the first time. The processor 301 determines the period from the time point ts0 to the time point te02, as the step period (step S204).

The processor 301 adds a margin before and after the step period, and determines a cut-out period (step S205). The processor 301 cuts out the waveform data (cut-out data) in the cut-out period from the target data 400 (step S206). Then, the synchronization process ends.

With reference back to FIG. 17, the processor 301 sets the window W to the cut-out data 410 and the reference data 308 for which synchronization has been achieved (step S103). The first window W is set at the start-edge of the detection target period.

The processor 301 calculates the average value of the measurement values of the cut-out data 410 in the window W, and subtracts the average value from each measurement value. Accordingly, the baseline of the cut-out data 410 is corrected (step S104).

The processor 301 calculates the distance between the reference data 308 and the cut-out data 410A after correction, as the anomaly degree (step S105).

The processor 301 compares the anomaly degree with the second threshold (step S106). When the anomaly degree is equal to or less than the second threshold (NO in step S106), the processor 301 proceeds to step S109.

When the anomaly degree exceeds the second threshold (YES in step S106), the processor 301 determines that an anomaly has occurred in the cutting tool 30. That is, the processor 301 detects an anomaly in the cutting tool 30 (step S107).

The processor 301 causes the display device 306 to display the detection of the anomaly in the cutting tool 30 (step S108). Accordingly, the user is notified of the detection of the anomaly.

The processor 301 determines whether or not the window W has reached the end-edge of the detection target period (step S109). When the window W has not reached the end-edge of the detection target period (NO in step S109), the processor 301 returns to step $103 and sets a period after a predetermined time from the window W, as a new window W. The processor 301 executes step S104 and thereafter. With the window W being sequentially updated, the anomaly degree is calculated in the entirety of the detection target period, and whether or not the cutting tool 30 is in an abnormal state is determined.

When the window W has reached the end-edge of the detection target period (YES in step S109), the processor 301 creates an anomaly degree graph of the detection target period and causes the display device 306 to display the anomaly degree graph (step S110). Then, the anomaly detection process ends.

7. Modification

In the embodiment described above, the cut-out period is set in an intermittent cutting step, and an anomaly in the cutting tool in the intermittent cutting step is detected. However, the present disclosure is not limited thereto. The cut-out period may be set in a continuous machining step, and an anomaly in the cutting tool in the continuous machining step may be detected. Further, a period that includes one or a plurality of intermittent cutting steps and one or a plurality of continuous machining steps may be set as the cut-out period, and an anomaly in the cutting tool in the cut-out period may be detected.

In the embodiment described above, as the anomaly degree, the distance between the time-series waveform of the reference data and the time-series waveform of the cut-out data (target data) is calculated. However, the present disclosure is not limited thereto. As the anomaly degree, the difference between the distribution of the reference data and the distribution of the cut-out data (target data) may be calculated. The distance between the time-series waveform of the reference data and the time-series waveform of the cut-out data is not limited to the DTW, and may be the Euclidean distance, for example. When the Euclidean distance is used as the anomaly degree, the phase of the time-series waveform of the cut-out data may be matched with the phase of the time-series waveform of the reference data. As the difference between the distribution of the reference data and the distribution of the cut-out data, the cross entropy may be calculated, or the density ratio may be estimated.

In the embodiment described above, an anomaly in the cutting tool 30 is detected by using the measurement data, of the strain in the cutting tool 30, obtained by the strain sensor 110. However, the present disclosure is not limited thereto. An anomaly in the cutting tool 30 may be detected by providing an acceleration sensor to the cutting tool 30 and using the acceleration in time series measured by the acceleration sensor. When an acceleration sensor is used, the difference between the distribution of the reference data of acceleration and the distribution of the target data of acceleration can be calculated as the anomaly degree.

8. Supplementary Note

The above embodiment is merely illustrative in all aspects and is not restrictive. The scope of the present disclosure is defined by the scope of the claims rather than the embodiment described above, and is intended to include meaning equivalent to the scope of the claims and all modifications within the scope.

REFERENCE SIGNS LIST

10 anomaly detection system
20 machine tool
30, 30A, 30B, 30C, 30D cutting tool
31A, 31B, 31C, 31D cutting part
32 cutting insert
33A, 33B, 33C fixing member
34, 35 cutting blade
100 sensor module
101 processor
102 nonvolatile memory
103 volatile memory
104 communication interface (communication I/F)
105 battery
110, 110A, 110B strain sensor
200 wireless device
300 anomaly detection device
301 processor
302 nonvolatile memory
303 volatile memory
304 input/output interface (I/O)
305 graphic controller
306 display device
307 anomaly detection program
308 reference data
309 measurement result DB
311 acquisition unit
312 synchronization unit
313 period setting unit
314 correction unit
315 distance calculation unit
316 anomaly detection unit
317 display control unit
400 target data
410, 410A cut-out data
A, B, C, D, E, F, A1, A2, A3 step
P1, P2, P3, P4, P5, P6, P_S, P_C period
P_A1, P_A2, P_A3 cut-out period
ts0, ts1, te01, te02, te1 time point
W window

The invention claimed is:

1. An anomaly detection system configured to detect an anomaly in a tool of a machine tool, the anomaly detection system comprising:

a sensor provided to the tool, the sensor being configured to measure a physical quantity, of the tool, that varies while the machine tool is machining a machining target object by means of the tool; and an anomaly detection device configured to detect an anomaly in the tool, based on measurement data obtained by the sensor, the anomaly detection device including processing circuitry configured to achieve synchronization between (1) target data being measurement data in time series obtained by the sensor and (2) reference data being a measurement result in time series of the physical quantity when the tool is in a normal state, calculate a distance between the reference data and the target data between which synchronization has been achieved, and detect an anomaly in the tool by comparing the distance with a threshold.

2. The anomaly detection system according to claim 1, wherein the processing circuitry is further configured to:

set a target period in a machining step, that is identical, in the reference data and the target data, and calculate the distance between the reference data and the target data in the target period.

3. The anomaly detection system according to claim 2, wherein the machining step is an intermittent cutting step in which cutting and non-cutting of the machining target object are repeated.

4. The anomaly detection system according to claim 1, wherein the sensor is a strain sensor configured to measure a strain in the tool as the physical quantity.

5. The anomaly detection system according to claim 1, wherein the sensor is an acceleration sensor configured to measure an acceleration of the tool as the physical quantity.

6. The anomaly detection system according to claim 1, wherein the processing circuitry is further configured to:

correct a baseline of the target data, and calculate the distance between the reference data and the target data of which the baseline has been corrected.

7. The anomaly detection system according to claim 1, wherein the distance between the reference data and the target data is a distance between a time-series waveform of the reference data and a time-series waveform of the target data or a difference between a distribution of the reference data and a distribution of the target data.

8. The anomaly detection system according to claim 1, wherein the processing circuitry is further configured to display a time-series graph of the distance between the reference data and the target data.

9. The anomaly detection system according to claim 1, wherein the processing circuitry is further configured to:

determine a cut-out period including one step in the target data, and extract a time-series waveform pattern of the determined cut-out period from the target data.

10. The anomaly detection system according to claim 9, wherein the processing circuitry is configured to achieve the synchronization by matching a start time of the step in the target data with a start time of the step in the reference data.

11. The anomaly detection system according to claim 1, wherein the processing circuitry is further configured to calculate a first moving average and a second moving average of the target data.

12. The anomaly detection system according to claim 11, wherein the processing circuitry is further configured to calculate an absolute value of a difference between the first moving average and the second moving average.

13. The anomaly detection system according to claim 12, wherein the processing circuitry is further configured to specify a time point when the absolute value of the difference between the first moving average and the second moving average exceeds a first threshold.

14. The anomaly detection system according to claim 13, wherein the processing circuitry is further configured to determine a provisional period starting from the specified time point.

15. The anomaly detection system according to claim 14, wherein the processing circuitry is further configured to compare the absolute value of the difference between the first moving average and the second moving average with the first threshold in a reverse time order from an end point of the provisional period.

16. The anomaly detection system according to claim 15, wherein the processing circuitry is further configured to determine a step period based on a time point when the absolute value of the difference between the first moving average and the second moving average exceeds the first threshold in the reverse time order.

17. The anomaly detection system according to claim 16, wherein the processing circuitry is further configured to determine a cut-out period by adding a margin before and after the step period.

18. An anomaly detection device configured to detect an anomaly in a tool of a machine tool, the anomaly detection device comprising:

processing circuitry configured to acquire measurement data in time series outputted from a sensor provided to the tool, the sensor being configured to measure a physical quantity, of the tool, that varies while the machine tool is machining a machining target object by means of the tool;

achieve synchronization between (1) target data being the measurement data in time series, and (2) reference data being a measurement result in time series of the physical quantity when the tool is in a normal state;

calculate a distance between the reference data and the target data between which synchronization has been achieved; and detect an anomaly in the tool by comparing the distance with a threshold.

19. An anomaly detection method executed by an anomaly detection device configured to detect an anomaly in a tool of a machine tool, the anomaly detection method comprising:

acquiring measurement data in time series outputted from a sensor provided to the tool, the sensor being configured to measure a physical quantity, of the tool, that varies while the machine tool is machining a machining target object by means of the tool;

achieving synchronization between (1) target data being the acquired measurement data in time series and (2) reference data being a measurement result in time series of the physical quantity when the tool is in a normal state;

calculating a distance between the reference data and the target data between which synchronization has been achieved; and detecting an anomaly in the tool by comparing the calculated distance with a threshold.

20. A computer-readable non-transitory storage medium having stored therein a computer program for detecting an anomaly in a tool of a machine tool, the computer program causing a computer to execute a method, the method comprising:

acquiring measurement data in time series outputted from a sensor provided to the tool, the sensor being configured to measure a physical quantity, of the tool, that varies while the machine tool is machining a machining target object by means of the tool;

achieving synchronization between (1) target data being the acquired measurement data in time series and (2) reference data being a measurement result in time series of the physical quantity when the tool is in a normal state;

calculating a distance between the reference data and the target data between which synchronization has been achieved; and detecting an anomaly in the tool by comparing the calculated distance with a threshold.

* * * * *